(12) United States Patent
Chen et al.

(10) Patent No.: US 10,170,156 B2
(45) Date of Patent: Jan. 1, 2019

(54) SYSTEMS, DEVICES AND METHODS FOR VIDEO STORAGE

(71) Applicant: Hangzhou Hikvision Digital Technology Co., Ltd., Hangzhou (CN)

(72) Inventors: Jianhua Chen, Hangzhou (CN); Shiliang Pu, Hangzhou (CN); Xiang Tan, Hnagzhou (CN); Hai Yu, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 261 days.

(21) Appl. No.: 14/994,270

(22) Filed: Jan. 13, 2016

(65) Prior Publication Data
US 2016/0211003 A1 Jul. 21, 2016

(30) Foreign Application Priority Data
Jan. 16, 2015 (CN) .......................... 2015 1 0024001

(51) Int. Cl.
*G11B 27/30* (2006.01)
*G11B 27/036* (2006.01)
(Continued)

(52) U.S. Cl.
CPC .... *G11B 27/3081* (2013.01); *G11B 20/00007* (2013.01); *G11B 20/10527* (2013.01); *G11B 27/034* (2013.01); *G11B 27/036* (2013.01); *H04N 19/107* (2014.11); *H04N 19/114* (2014.11); *H04N 19/146* (2014.11); *H04N 19/177* (2014.11); *H04N 21/00* (2013.01); *H04N 21/4334* (2013.01); *G11B 2020/00072* (2013.01)

(58) Field of Classification Search
CPC ............. G11B 27/3081; H04N 19/107; H04N 19/114; H04N 19/146; H04N 19/177
See application file for complete search history.

(56) References Cited

U.S. PATENT DOCUMENTS 7,016,411 B2 3/2006 Azuma et al.
9,232,233 B2 1/2016 Zhou et al.
(Continued)

FOREIGN PATENT DOCUMENTS

CN 103179402 A 6/2013
EP 0695098 A2 1/1996
(Continued)

OTHER PUBLICATIONS

U.S. Appl. No. 14/995,256, filed Jan. 14, 2016, Chen et al.
U.S. Appl. No. 14/995,243, filed Jan. 14, 2016, Shen et al.

*Primary Examiner* — Mishawn N Hunter
(74) *Attorney, Agent, or Firm* — Jones Day

(57) ABSTRACT

Systems, devices and methods are provided for video storage. For example, video data is acquired for generating buffer zone data, the buffer zone data beginning with an I frame or an R frame of the video. At least part of the buffer zone data is stored to a storage fragment in a storage area. In response to the storage fragment being newly opened and a first frame of the at least part of the buffer zone data being an R Frame, an I Frame with reference relation to the first frame is inserted to the storage fragment, the R Frame corresponding to a picture frame referring to the I Frame.

13 Claims, 17 Drawing Sheets

(51) Int. Cl.
  G11B 20/00    (2006.01)
  G11B 20/10    (2006.01)
  G11B 27/034   (2006.01)
  H04N 21/00    (2011.01)
  H04N 19/114   (2014.01)
  H04N 21/433   (2011.01)
  H04N 19/107   (2014.01)
  H04N 19/146   (2014.01)
  H04N 19/177   (2014.01)

(56)           References Cited

U.S. PATENT DOCUMENTS

2006/0120449 A1*  6/2006  Lee .................. H04N 19/61
                                                    375/240.2
2009/0180533 A1   7/2009  Bushell
2011/0007131 A1*  1/2011  Okada ............... H04N 13/0022
                                                       348/42
2012/0155859 A1*  6/2012  Kakadia ............. H04L 41/145
                                                       398/25

FOREIGN PATENT DOCUMENTS

EP           1725049 A1   11/2006
WO     WO 2003/007603 A1   1/2003
WO     WO 2007/093199      8/2007
WO     WO 2010/043140      4/2010
WO     WO 2014/001381 A2   1/2014

* cited by examiner

| Time | ... | 0:00:25 | 0:00:24 | 0:00:23 | ... | 0:00:00 |
|---|---|---|---|---|---|---|
| | ... | I Frame | R Frame | R Frame | ... | I Frame |
| Quick Retrieval Information | | frame type, frame length, relative time mark, absolute time mark, offset in the storage fragment ... | frame type, frame length, relative time mark, absolute time mark, offset in the storage fragment ... | frame type, frame length, relative time mark, absolute time mark, offset in the storage fragment ... | | frame type, frame length, relative time mark, absolute time mark, offset in the storage fragment ... |

Figure 9

SYSTEMS, DEVICES AND METHODS FOR VIDEO STORAGE

CROSS-REFERENCES TO RELATED APPLICATIONS

The application claims priority to Chinese Patent Application No. 201510024001.4, filed Jan. 16, 2015, incorporated by reference herein for all purposes.

BACKGROUND

Video surveillance becomes ubiquitous in modern life, and is used to serve residential security, transportation security, hygiene security, societal security, and production security. For reducing storage costs of large amount of surveillance video or adapting to the need for low bit rate transmission, reduction in encoder bit rates is often sought while good video quality is maintained.

For conventional encoders, encoded frames often include three types of frames: I Frames, P Frames, and B Frames. FIG. 1 is an example diagram showing a reference relationship among the three frame types. An I Frame is an intra encoded frame which has no dependency on other frames, and may be decoded into a complete picture by itself, without reference to any other frames. An I Frame is a key frame for video decoding to provide video data. A P Frame is a forward prediction frame, and often refers to a preceding frame. During encoding, either an intra-frame-prediction mode can be used, or inter-frame prediction can be carried out by referring to a preceding P Frame or a preceding I Frame. For example, considering movement characteristics, inter-frame compression is carried out based on redundant time field information. A B Frame is a bidirectional prediction frame which can refer to a preceding frame and can also refer to a following frame. Therefore, a P Frame and a B Frame both need to refer to other frames, and have dependency on other frames. A P Frame or a B Frame cannot be decoded into a complete picture solely by itself. Usually, an I Frame together with a P frame and a related B frame are jointly referred to as a Group of Pictures (GOP).

In some circumstances, random access or video playback is needed for an encoded bit stream (e.g., a video recording file). If a desired access or playback start time is T and a frame corresponding to T is recorded as F, the decoding process begins with an I Frame which is closest to Frame F in order to access or playback Frame F. The decoding time from the I Frame to Frame F corresponds to a wait time. If a GOP length is overly long, then an average wait time for random access or video playback may be long, which affects the random access efficiency. Therefore, the GOP length of conventional encoders is often relatively short (e.g., 25 frames, 50 frames, etc.) and usually does not exceed 100 frames.

Currently, the surveillance industry broadly utilizes digital video recorders (DVRs) as video storage equipment. A DVR is a type of surveillance equipment that can record video and audio data using a data hard drive, such as a regular digital hard drive video recorder (e.g., interfacing with analog video cameras), a hybrid DVR, and a network video recorder (NVR). Surveillance video often needs to be stored for a relatively long period of time, and thus the storage equipment often has a relatively large storage capacity. To facilitate storage and access, a large capacity storage area is further divided into sub-storage areas of similar sizes (e.g., "fragments"). Video data is stored to different fragments. FIG. 2 is an example diagram showing a large capacity storage area being divided into "fragments."

FIG. 3 is an example flow chart of a conventional video data storage process. As shown in FIG. 3, during the process of video data storage, a storage equipment opens a data buffer zone used for temporarily storing a latest segment of video encoding data. Upon the receipt of a recording command, the storage equipment checks whether an I frame exists in the current buffer zone. If no I frame exists in the current buffer zone, the storage equipment waits for an I Frame to appear, and then, from a start position of the I Frame, accumulates data in the buffer zone. Once the data in the buffer zone reaches a certain size, for example, 512 kilobytes, then the data is written once to the hard drive. Prior to actually saving the buffer zone video data to a current fragment, the storage equipment judges whether a sum of the data volume in the current fragment and the data volume in the buffer zone exceeds a threshold value (e.g., the size of the current fragment). If the sum does not exceed the threshold value, the video encoding data in the data buffer zone is stored to the current fragment. On the other hand, if the sum exceeds the threshold value, a new fragment is opened and the video encoding data in the data buffer zone is stored to the new fragment.

To facilitate future random access and video playback of the video data, cross-fragment reference of video data often needs to be avoided, which means that reference relation between encoded frames across different fragments is to be avoided. Thus, data in each fragment usually begins with an I Frame. This way, one or more P Frames and/or one or more B Frames which follow the I Frame have reference relation with the I Frame in the current fragment only and are unrelated to the video data in the previous fragment. However, when the data in the current buffer zone is to be stored to a new fragment, the current buffer zone may not have an I Frame, or the data in the current buffer zone may not begin with an I frame. Thus, storing the data in the current buffer zone at this juncture to the new fragment makes it hard to ensure that the new fragment begins with an I Frame. The conventional approach is to discard the portion of the bit stream (i.e., data in the current buffer zone), and then send a command to an encoder to force-encode an I Frame. Then, data begins with the I Frame is stored to the new fragment. The conventional approach guarantees that the new fragment begins with the I Frame, but it causes bit stream loss for a period of time.

The above-noted conventional approach for video data storage may be suitable and effective for bit streams output of a traditional encoder, because time intervals between I Frames in the bit streams output by the traditional encoder are usually not very long and the number of frames is not large. However, if the time intervals between I Frames in the bit streams output by an encoder are very long (e.g., several minutes or even several hours), the number of frames of a GOP video is very large. This means that the data volume of the GOP is large, and the proportion of I Frames in the buffer zone is very low. If the data in the buffer zone needs to be stored to a new fragment and the buffer zone does not include an I Frame or does not begin with an I frame, at least a portion of the data in the buffer zone may be discarded and force-encoding of an I Frame may be performed, which may destruct the bit stream structure of long GOP encoding. In addition, not all encoders support force-encoding of I Frames. Therefore, the above-noted conventional approach for video surveillance data storage may be suitable in some circumstances where a GOP length is relatively short, but may not be satisfactory for video surveillance data storage when a GOP length is long.

Hence it is highly desirable to improve the techniques for video storage.

BRIEF SUMMARY

According to one embodiment, a method is provided for video storage. For example, video data is acquired for generating buffer zone data, the buffer zone data beginning with an I frame or an R frame of the video. At least part of the buffer zone data is stored to a storage fragment in a storage area. In response to the storage fragment being newly opened and a first frame of the at least part of the buffer zone data being an R Frame, an I Frame with reference relation to the first frame is inserted to the storage fragment, the R Frame corresponding to a picture frame referring to the I Frame.

According to another embodiment, a device for video storage includes: a buffer zone data acquisition unit configured to acquire video data for generating buffer zone data, the buffer zone data beginning with an I frame or an R frame of the video; and a data storage unit configured to: store at least part of the buffer zone data to a storage fragment in a storage area associated with one or more non-transitory storage media; and in response to the storage fragment being newly opened and a first frame of the at least part of the buffer zone data being an R Frame, insert an I Frame with reference relation to the first frame to the storage fragment, the R Frame corresponding to a picture frame referring to the I Frame.

According to yet another embodiment, a method for video reading is provided. For example, a corresponding frame in video data that corresponds to time mark information is determined. In response to the corresponding frame not being independently decoded and being an R Frame, an I Frame with reference relation to the corresponding frame is located based at least in part on the time mark information. In response to the corresponding frame not being independently decoded and not being an R Frame, an R Frame with reference relation to the corresponding frame and an I Frame with reference relation to the R Frame are located based at least in part on the time mark information, the located R Frame corresponding to a picture frame referring to the located I Frame. The R Frame is decoded through the I Frame. One or more other frames that follow the R Frame are decoded to obtain the video data to be read.

In one embodiment, a device for video reading includes: a corresponding frame processing unit configured to determine a corresponding frame in video data that corresponds to time mark information; a first positioning unit configured to, in response to the corresponding frame not being independently decoded and being an R Frame, locate an I Frame with reference relation to the corresponding frame based at least in part on the time mark information; a second positioning unit configured to, in response to the corresponding frame not being independently decoded and not being an R Frame, locate an R Frame with reference relation to the corresponding frame and an I Frame with reference relation to the R Frame based at least in part on the time mark information, the located R Frame corresponding to a picture frame referring to the located I Frame; and a video sequence reading unit configured to decode the R Frame through the I Frame and decode one or more other frames that follow the R Frame to obtain the video data to be read.

In another embodiment, a system for video storage includes: a video storage device; and a video reading device. The video storage device includes: a buffer zone data acquisition unit configured to acquire video data for generating buffer zone data, the buffer zone data beginning with an I frame or an R frame of the video; a data storage unit configured to: store at least part of the buffer zone data to a storage fragment in a storage area associated with one or more non-transitory storage media; and in response to the storage fragment being newly opened and a first frame of the at least part of the buffer zone data being an R Frame, insert an I Frame with reference relation to the first frame to the storage fragment, the R Frame corresponding to a picture frame referring to the I Frame. The video reading device includes: a corresponding frame processing unit configured to determine a corresponding frame in the video data that corresponds to time mark information; a first positioning unit configured to, in response to the corresponding frame not being independently decoded and being an R Frame, locate an I Frame with reference relation to the corresponding frame based at least in part on the time mark information; a second positioning unit configured to, in response to the corresponding frame not being independently decoded and not being an R Frame, locate an R Frame with reference relation to the corresponding frame and an I Frame with reference relation to the R Frame based at least in part on the time mark information, the located R Frame corresponding to a picture frame referring to the located I Frame; and a video sequence reading unit configured to decode the R Frame through the I Frame and decode one or more other frames that follow the R Frame to obtain the video data to be read.

Depending upon embodiment, one or more benefits may be achieved. These benefits and various additional objects, features and advantages of the present invention can be fully appreciated with reference to the detailed description and accompanying drawings that follow.

BRIEF DESCRIPTION OF THE DRAWINGS

FIG. 9 is an example diagram showing a quick retrieval information list according to one embodiment of the present invention.

DETAILED DESCRIPTION OF THE INVENTION

Figure 1:
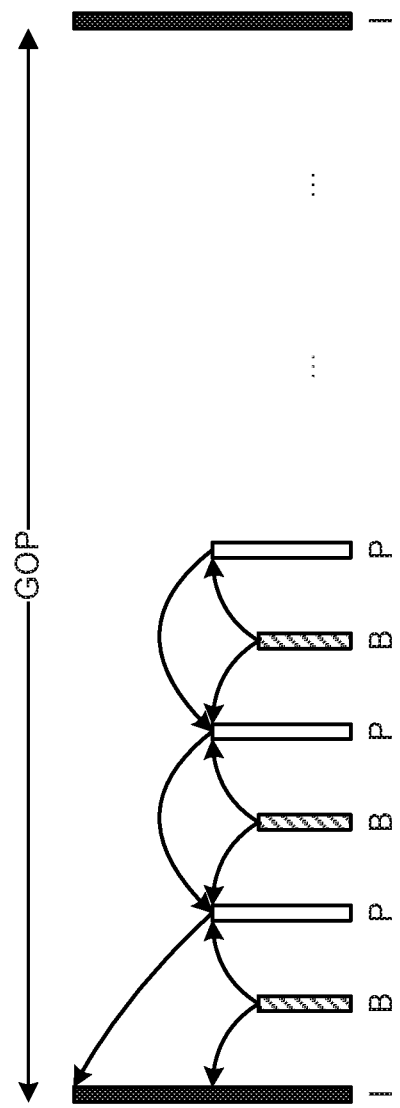
FIG. 1 is an example diagram showing a reference relationship among the three frame types.
Figure 2:
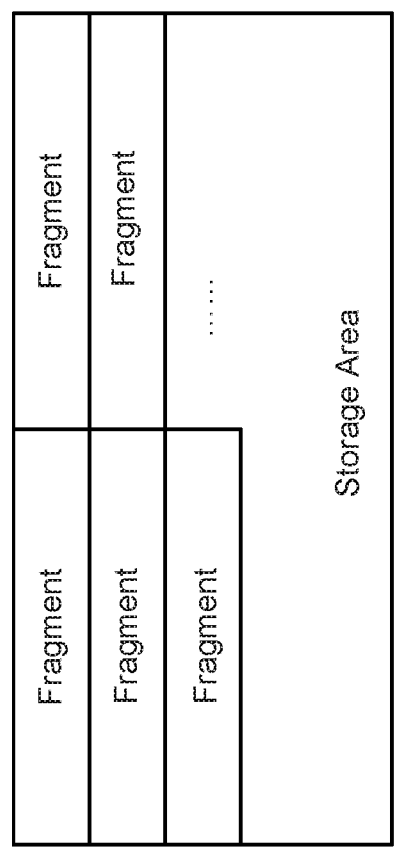
FIG. 2 is an example diagram showing a large capacity storage area being divided into fragments.
Figure 3:
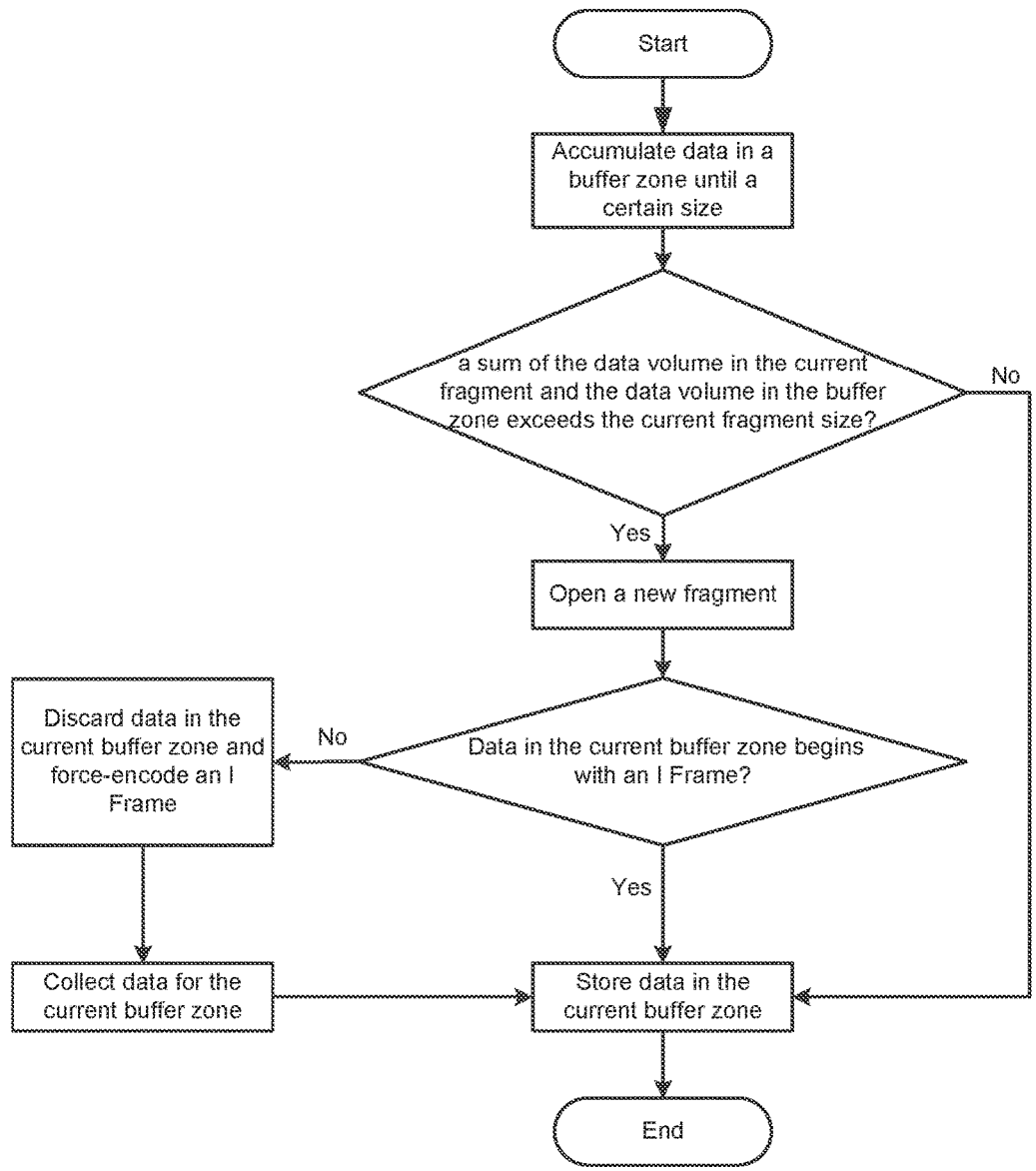
FIG. 3 is an example flow chart of a conventional video data storage process.
Figure 4:
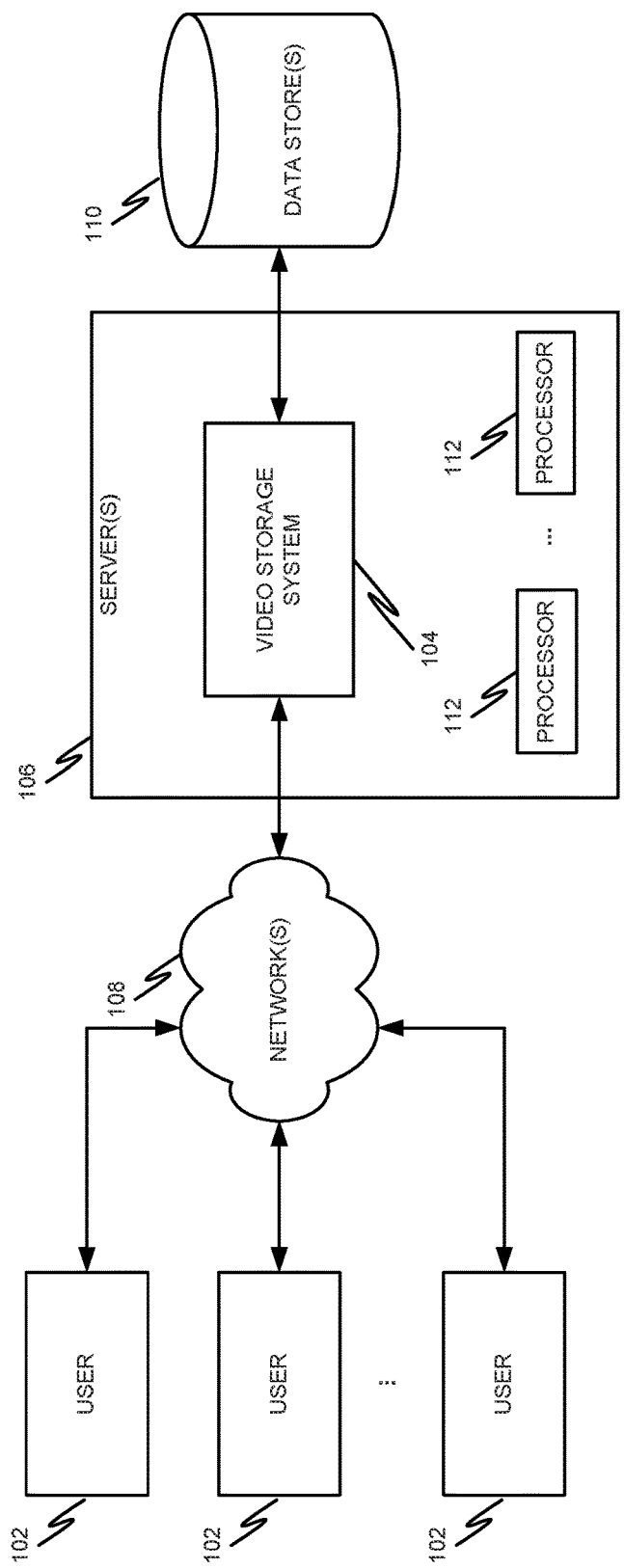
FIG. 4 is an example computer-implemented environment wherein users can interact with a video storage system hosted on one or more servers through a network, according to one embodiment of the present invention.

FIG. 4 is an example computer-implemented environment wherein users 102 can interact with a video storage system 104 hosted on one or more servers 106 through a network 108, according to one embodiment of the present invention. As shown in FIG. 4, the users 102 can interact with the video storage system 104 through a number of ways, such as over one or more networks 108. One or more servers 106 accessible through the network(s) 108 can host the video storage system 104. The one or more servers 106 can also contain or have access to one or more data stores 110 for storing data for the video storage system 104. The one or more servers 106 implement one or more data processors 110. For example, the data processors 110 can be configured for parallel computing.

The video storage system 104 can assist the users 102 to implement a video data storage algorithm for video surveillance data storage in various circumstances, such as in communities, factories, buildings, military compounds, roadways and other circumstances, to provide people with residential security, transportation security, hygiene security, societal security, and production security.

Particularly, the video storage system 104 can assist the users 102 to implement the video data storage algorithm for long term, continuous video surveillance data acquisition and storage.

Figure 5:
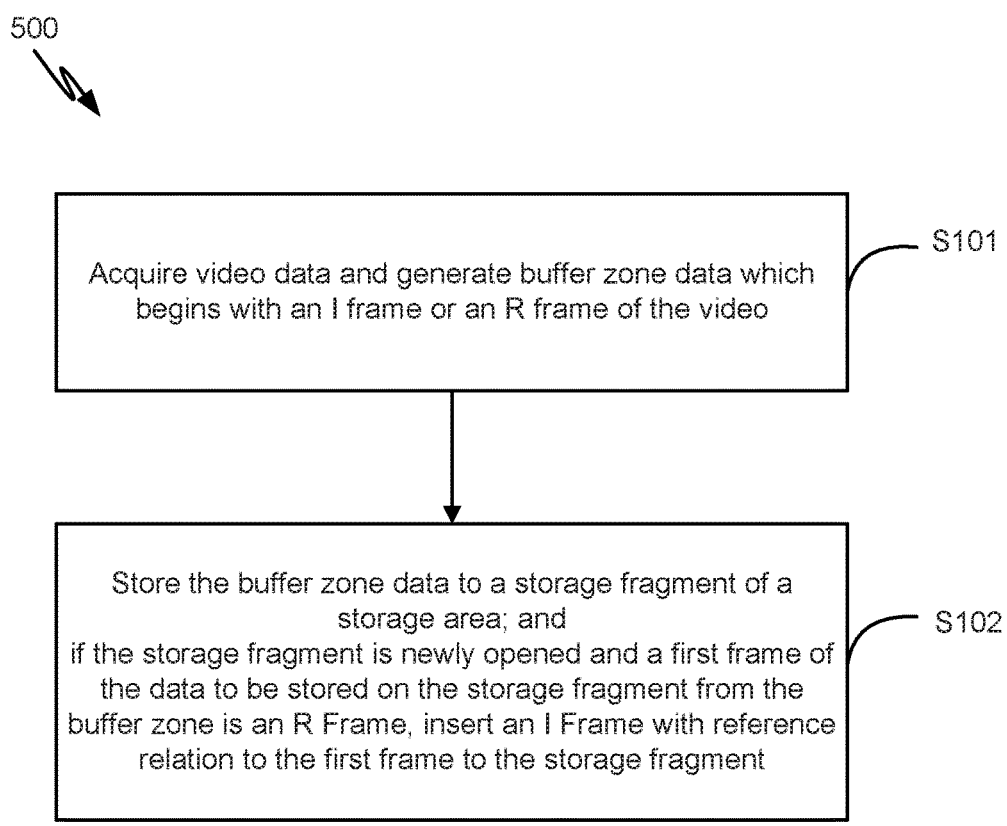
FIG. 5 is an example flow diagram showing a method for video data storage, according to one embodiment of the present invention.

FIG. 5 is an example flow diagram showing a method for video data storage according to one embodiment of the present invention. As shown in FIG. 5, the method 500 includes processes S101-S102. The process S101 includes: acquiring video data for generating buffer zone data which begins with an I frame or an R frame of the video, according to some embodiments.

Compared with conventional video storage methods, the embodiments in the present disclosure adopt a different frame encoding approach. It is usually desirable to reduce bit rate and maintain video quality for storage cost saving and/or transmission cost saving (low bit rate transmission) during video storage (especially, a large amount of surveillance video storage). Oftentimes, different types of frames under similar circumstances have different data sizes (e.g., in a descending order, I Frames, P Frames, and B Frames). The total number of frames of the video usually does not change. If a proportion of the I Frames is reduced and an I Frame interval is extended, the GOP length increases. Thus, with a same frame rate, the bit rate can be reduced.

Conventional random access and video playback methods are often not suitable for long GOP. If an I Frame interval is extended to increase the GOP length (e.g., to one hour), then a decoder usually needs to decode data of all frames beginning with an I frame which is closest to a frame corresponding to a playback time in order to normally decode the frame corresponding to the playback time and provide a user with video data. If the frame rate is 25 frames per second (fps), under extreme circumstances, the decoder may need to decode around 90,000 frames from the I Frame before the user can begin normal access and playback of the video data. Therefore, on one hand, the computing burden of the decoder is increased. For example, all frames which precede the frame corresponding to the playback time may need to be decoded for any random access request. On the other hand, the user may need to wait long enough for the decoding computation so that the user wait time is prolonged which results in poor user experience. Moreover, based on varying stability levels of surveillance environments, GOP may even be extended to several days, which can result in even lower random access decoding efficiency. If the frame rate is 30 fps, 60 fps or higher, then the conventional random access and video playback methods may more negatively affect the user experience.

Figure 6:
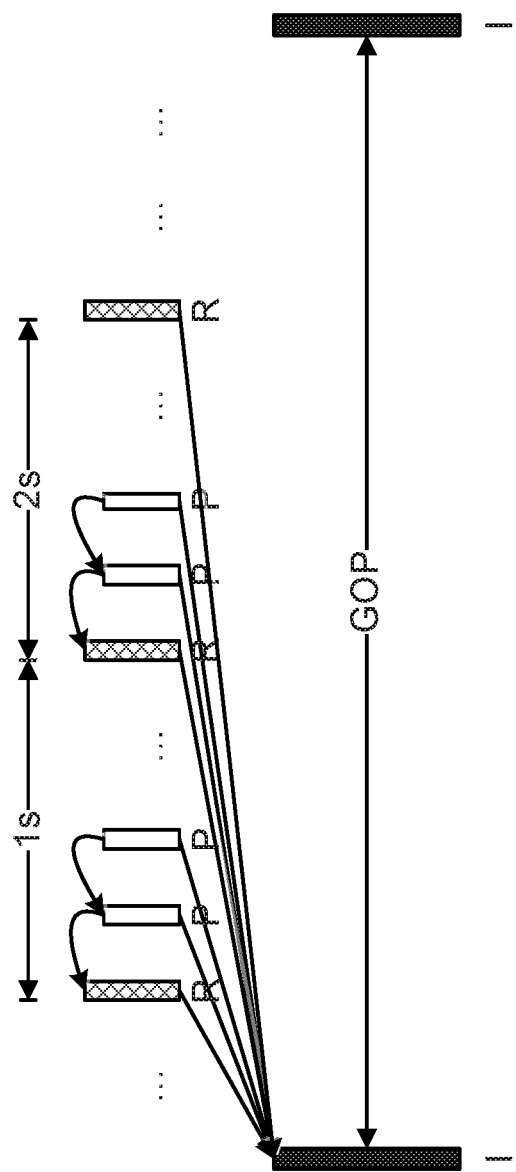
FIG. 6 is an example diagram showing configuration of R Frames, according to one embodiment of the present invention.

To overcome the disadvantages of the conventional methods, R Frames are configured (e.g., as shown in FIG. 6). An R Frame is essentially a special P Frame, and makes reference in a forward direction. In some embodiments, an R Frame can only refer to a preceding I Frame and cannot refer to a preceding common P Frame. A common P Frame does not have such a restriction as long as the common P Frame does not refer to other P Frames crossing an R Frame. P Frames and B Frames are non-key frames which can only refer to neighboring frames to complete decoding. In certain embodiments, the reference relation of B Frames is similar to that of B Frames in known methods. For simplicity, B Frames are not described in detail here. A collection of an R Frame and one or more P Frames following the R frame is taken as a smallest unit for data processing.

When video data is acquired for generating buffer zone data, the generated buffer zone data begins with an I frame or an R frame of the video. The R Frame interval can be random or periodic. For example, the bit stream can be "I R1 P P P R2 P P P P P P R3 P P R4 . . . "; or "I R1 P P P R2 P P P R3 P P P R4 . . . " Correspondingly, the buffer zone data can be "I R1 P P P;" or "I R1 P P P R2 P PPP PP;" or "I R1 P P P R2 P P P P P P R3 P P."

In terms of the design of a buffer zone, units of storage data are not based on fixed length or fixed size. Instead, the units of storage data are based on reference relation. In some embodiments, the buffer zone data begins with an R Frame or an I Frame and ends with one or more non-key frames (e.g., common P Frames, B Frames) that have reference relation with the R Frame or the I Frame. For example, if the first frame is an I Frame, then the remaining data includes R Frames and/or P Frames (or B Frames in some circumstances) that have reference relation with the I Frame. If the first frame is an R Frame, then the remaining data includes P Frames (or B Frames in some circumstances) that have reference relation with the R Frame. When video data is acquired again for generating buffer zone data, a new I Frame or a new R Frame may be determined and subsequent operations can be carried out.

In certain embodiments, in a unit of buffer zone data, multiple R Frames and P Frames corresponding to the R Frames may be acquired, as long as the sizes of the storage fragment and the buffer zone data are properly considered. For example, one or more I Frames, one or more R Frames, and/or one or more non-key frames in the buffer zone data which have reference relation can be stored to a same storage fragment.

Referring back to FIG. 5, the process S102 includes: storing the buffer zone data to a storage fragment in a storage area; and if the storage fragment is newly opened and a first frame of the data to be stored to the storage fragment is an R Frame, inserting an I Frame with reference relation to the first frame to the storage fragment. For example, the R Frame in the buffer zone data is a picture frame only referring to the I Frame.

In some embodiments, the R Frame can be used as an object of reference for subsequent non-key frames, and the I Frame, the R Frame, and/or non-key frames with reference relation are stored to the same storage fragment in the storage area. If the buffer zone data begins with an R Frame, a particular set of frames associated with the R Frame in the buffer zone data may not be used independently for decoding the corresponding video stream, even though the frames in the buffer zone data have reference relation with each other.

After acquisition of a unit of buffer zone data is completed and stored to the storage area, to avoid cross-section decoding during video reading, a unit of buffer zone data is first stored to a storage fragment, and P Frame decoding begins with the corresponding I Frame or R Frame on the same storage fragment. Next, for a new storage fragment, the stored buffer zone data of the first unit can have two situations. One is that the first frame is an I Frame, and the other is that the first frame is an R Frame. For buffer zone data where the first frame is an I Frame, decoding can be directly achieved via the I Frame, and related data is stored to the storage fragment. For buffer zone data where the first frame is an R Frame, an R Frame itself is unable to achieve independent decoding. Thus, an I Frame corresponding to the R Frame is inserted at the very front of a newly created storage fragment as the basis for decoding of the R Frame and P Frames that follow the R Frame.

The I Frame that is referred to by the R Frame can be inserted through many approaches. For example, one approach is to buffer the I Frame upon the first instance of the I Frame. When the I Frame is needed to be inserted, the buffered I Frame is simply inserted in front of the R Frame. Because an I Frame could be inserted before multiple R Frames, the buffered I Frame is only replaced upon the appearance of a new I Frame. Another approach is to directly read a nearest I Frame from a preceding storage fragment, and insert the nearest I frame before the R Frame.

In sum, the buffer zone data is generated through video acquisition, and the buffer zone data begins with an I Frame or an R Frame of the video, according to some embodiments. The buffer zone data is stored to a fragment of the storage area. If the fragment is a newly opened fragment and the first frame of the data to be stored is an R Frame, then an I Frame with reference relation to the first frame is inserted to the newly opened storage fragment. The R Frame in the buffer zone data is a picture frame that only refers to the I Frame. For example, the schemes/methods disclosed herein can be configured to avoid bit stream loss and change of GOP encoding bit stream structure during the process of storage, and avoid cross-storage fragment referencing during the process of reading video, thus achieving quick decoding in random access.

Figure 7:
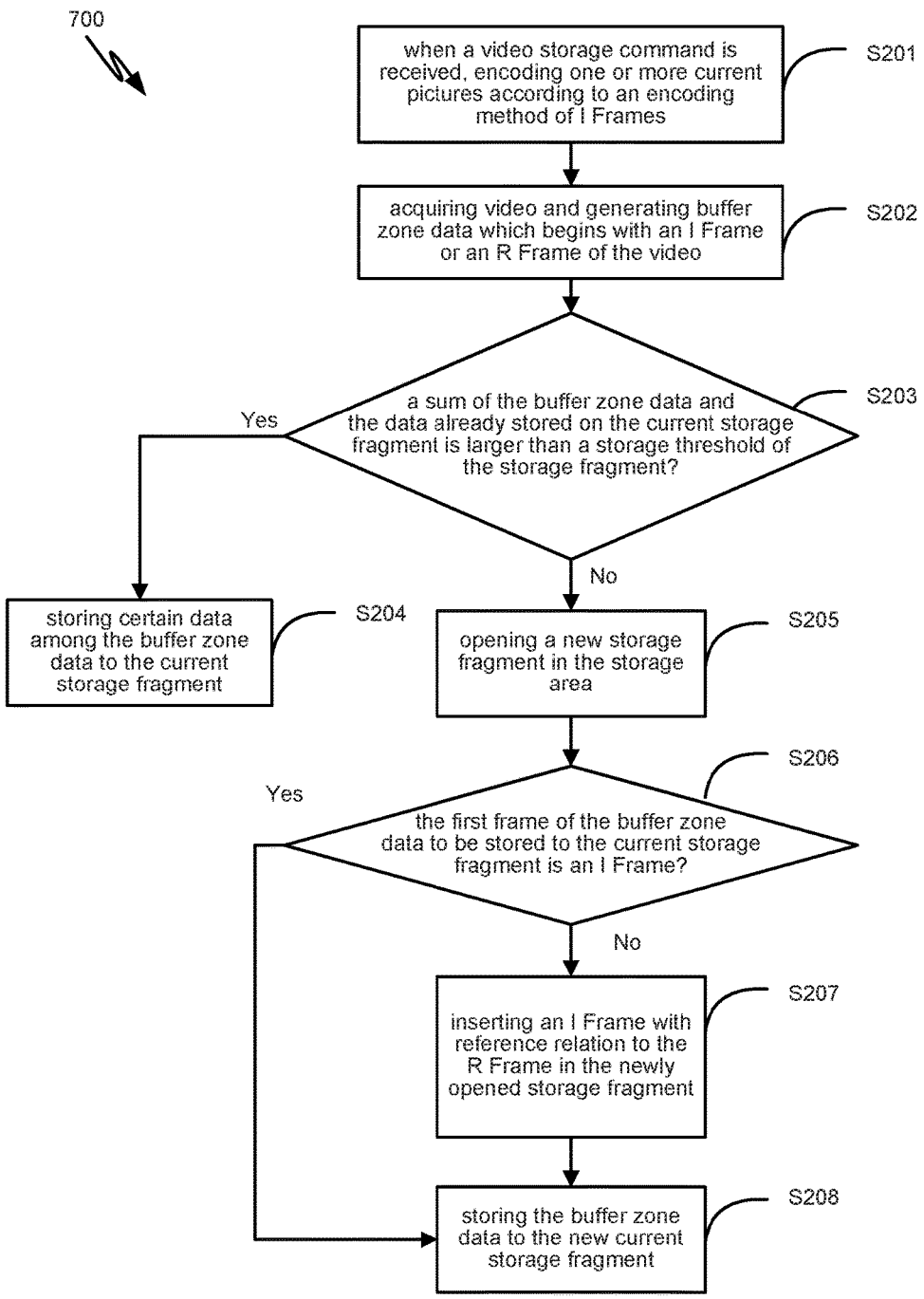
FIG. 7 is an example flow chart for video storage, according to one embodiment of the present invention.

FIG. 7 is an example flow chart for video storage, according to one embodiment of the present invention. As shown in FIG. 7, the method 700 includes multiple processes. According to one embodiment, during the process S201, when a video storage command is received, one or more current pictures are encoded according to an encoding method of I Frames. For example, in a video surveillance system, because of usage environment demands, a video acquisition tool continuously acquires video data, but does not store the video data. When a video storage command is received, the video acquisition tool acquires one or more current pictures that include a current frame to be stored to the storage area, where the current frame is not an I Frame. The current pictures can be encoded according to the encoding method of I Frames. In some embodiments, the specific operation to achieve encoding can be realized by an encoding device integrated with the storage device.

For example, the storage device is enabled to send the video storage command to an external encoder, and when the encoder receives the video storage command, the current pictures are encoded according to the encoding method of I Frames. In another example, the video acquisition tool or a storage equipment related to the video acquisition tool (e.g., a buffer) is searched to see if any stored I Frames exist. If I Frames exist, the I Frames are acquired to the data buffer zone.

According to another embodiment, the process S202 includes: acquiring video and generating buffer zone data which begins with an I Frame or an R Frame of the video. In the buffer zone data, an R Frame interval can be random or cyclical. For example, each cycle corresponds to a video length of 1-3 seconds. In one embodiment, in a random state, there are a relatively large number of P Frames that follow an R Frame. In order to guarantee that all subsequent P Frames can be buffered to the data buffer zone, the storage space of the data buffer zone is configured to be sufficiently large. In some embodiments, the number of P Frames that follow an R Frame is random within a controlled range, e.g., not greater than the number of frames between two I Frames.

In certain embodiments, the length of the video corresponding to the buffer zone data is 1-3 seconds. Taking 2 seconds as an example, if the video data acquired in each second is 25 frames, then a unit of buffer zone data is 50 frames. The first frame is an I Frame or an R Frame, and only a small number of the frames are I Frames. For stability of various application scenarios, the GOP length may be extended to several days. That is, the video of several days only has one I Frame. Other than the buffer zone data that contains the I Frame, the first frames of the remaining buffer zone data are R Frames. For example, if an F Frame corresponding to a time T needs to be decoded, the I Frame is first decoded, and a R Frame corresponding to the F frame is decoded based on the reference relation. Then the successive frame-by-frame decoding beginning from the R frame is performed. Finally the selected F Frame is read.

According to another embodiment, the process S203 includes: determining whether a sum of certain data in the buffer zone data to be stored to the current storage fragment and the data already stored on the current storage fragment is larger than a storage threshold of the storage fragment. If the sum of the data to be stored to the current storage fragment and the data already stored on the current storage fragment is not larger than the storage threshold of the storage fragment, then the process S204 is executed. Otherwise, the process S205 is executed.

In specific embodiments, to ensure that the I Frames, R Frames, and non-key frames of the buffer zone data that have reference relationship are to be stored to the same storage fragment, prior to storing the buffer zone data to the storage fragment, it is determined if the remaining storage space of the storage fragment is sufficient for storing the buffer zone data. If the remaining storage space is sufficient, then the process S204 is executed to store the buffer zone data. Otherwise, a new storage fragment is opened in the storage area. Various techniques (e.g., any known techniques) can be implemented for data storage process and distribution solutions of the storage area.

In one embodiment, the process S204 includes: storing certain data among the buffer zone data to the current storage fragment. In another embodiment, the process S205 includes: opening a new storage fragment in the storage area. In yet another embodiment, the process S206 includes: determining whether the first frame of the buffer zone data to be stored to the current storage fragment is an I Frame. If the first frame of the buffer zone data to be stored to the current storage fragment is an I Frame, the process S208 is executed. Otherwise, the process S207 is executed. For example, determining whether the first frame is an I Frame is to avoid the occurrence of cross-storage fragment reference during accessing of stored video data, so as to enable all inter-frame relation to be achieved on a single storage fragment.

In some embodiments, the process S207 includes: inserting an I Frame with reference relation to the R Frame at the very front of the newly opened storage fragment. For example, an I Frame with reference relation to the R Frame is inserted to the newly opened storage fragment before the buffer zone data is stored to the newly opened storage fragment, so that the I Frame is located at the very front of the storage fragment, thereby facilitating subsequent decoding.

As described above, in the process S202, when the GOP length reaches several days, GOP video data may not be stored to a single storage fragment. If the GOP video data is simply broken up for storage, then some storage fragments end up lacking an I Frame. Because the buffer zone data begins with an I Frame or an R Frame, if the first frame is not an I Frame, then the first frame is an R Frame. But an R Frame cannot be independently decoded. If no I Frame exists on a storage fragment, when access is made to the video data, cross-storage fragment reference relation is likely to occur, which may reduce the access efficiency.

Figure 8:
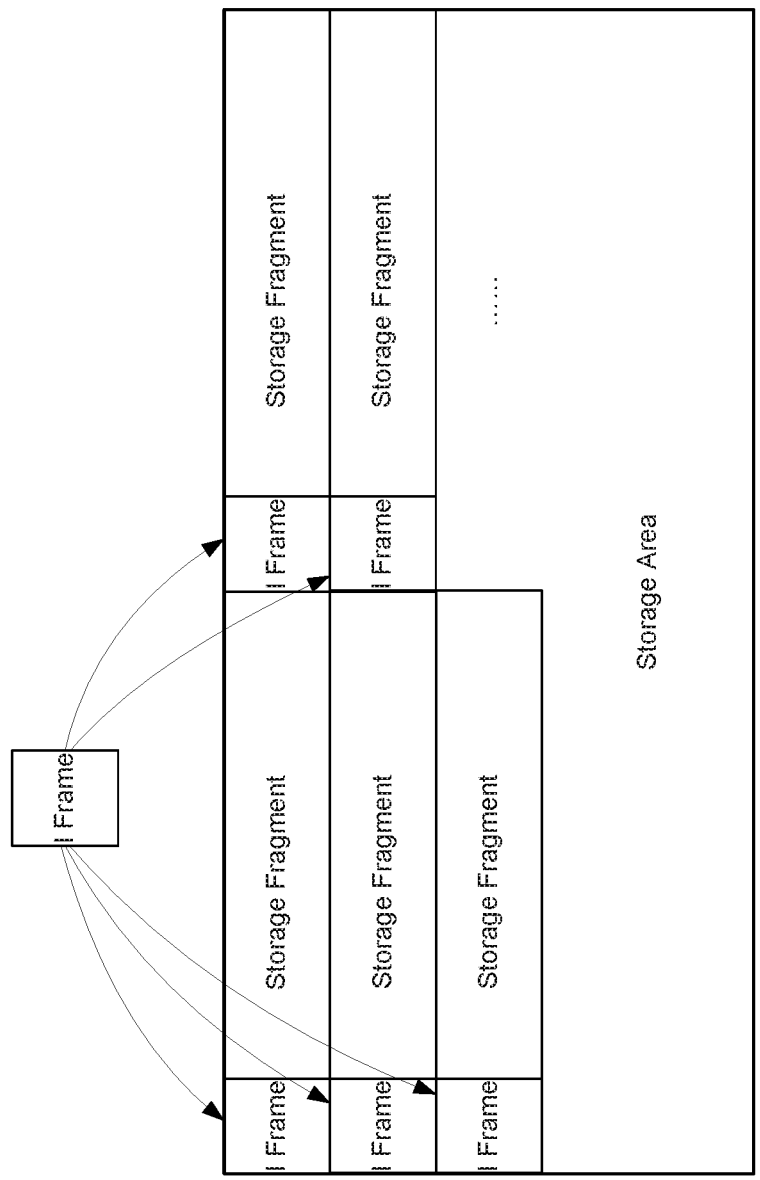
FIG. 8 is an example diagram showing a storage structure of a storage area, according to one embodiment of the present invention.

FIG. 8 is an example diagram showing a storage structure of a storage area, according to one embodiment of the present invention. For example, the effects achieved by the process S207 are shown in FIG. 8. In some embodiments, to ensure that each storage fragment is provided with an I Frame, a backup of the I Frame is provided to each storage fragment. During decoding, the video data in each storage fragment directly refers to the backup I Frame in the storage fragment.

Referring back to FIG. 7, the process S208 includes: storing the buffer zone data that is to be stored to the current storage fragment to the new storage fragment. Specifically, a quick retrieval information list is established. The design of the quick retrieval information list is to facilitate quick retrieval in random access of storage data or video playback. When bit streams are stored according to the method 700 as shown in FIG. 7, quick retrieval information of I Frame(s) and/or R Frame(s) is recorded in the quick retrieval information list. For example, the quick retrieval information includes a frame type, a frame length, a relative time mark, an absolute time mark, an offset relative to a start location of the storage fragment, etc. The R Frame is a reference object for subsequent non-key frames. Moreover, I Frames, R Frames, and non-key frames with reference relation are stored on the same storage fragment in the storage area.

FIG. 9 is an example diagram showing a quick retrieval information list, according to one embodiment of the present invention. In some embodiments, during random access of a particular frame in a video sequence, an R Frame and an I Frame with reference relation are located based on time mark information of the particular frame. The I Frame, the R Frame, and one or more common P Frames that follow the R Frame and have reference relation with the R Frame are then decoded, so as to achieve quick decoding. That is, the time length of GOP could be several days, but any frame's decoding at most may not exceed the time length of the buffer zone data plus an I Frame. For example, multiple data buffer zones can be configured. The data in the data buffer zones is to be set near a maximum value of the data buffer zone, and the data of the data buffer zone is stored to the storage fragment.

Figure 10:
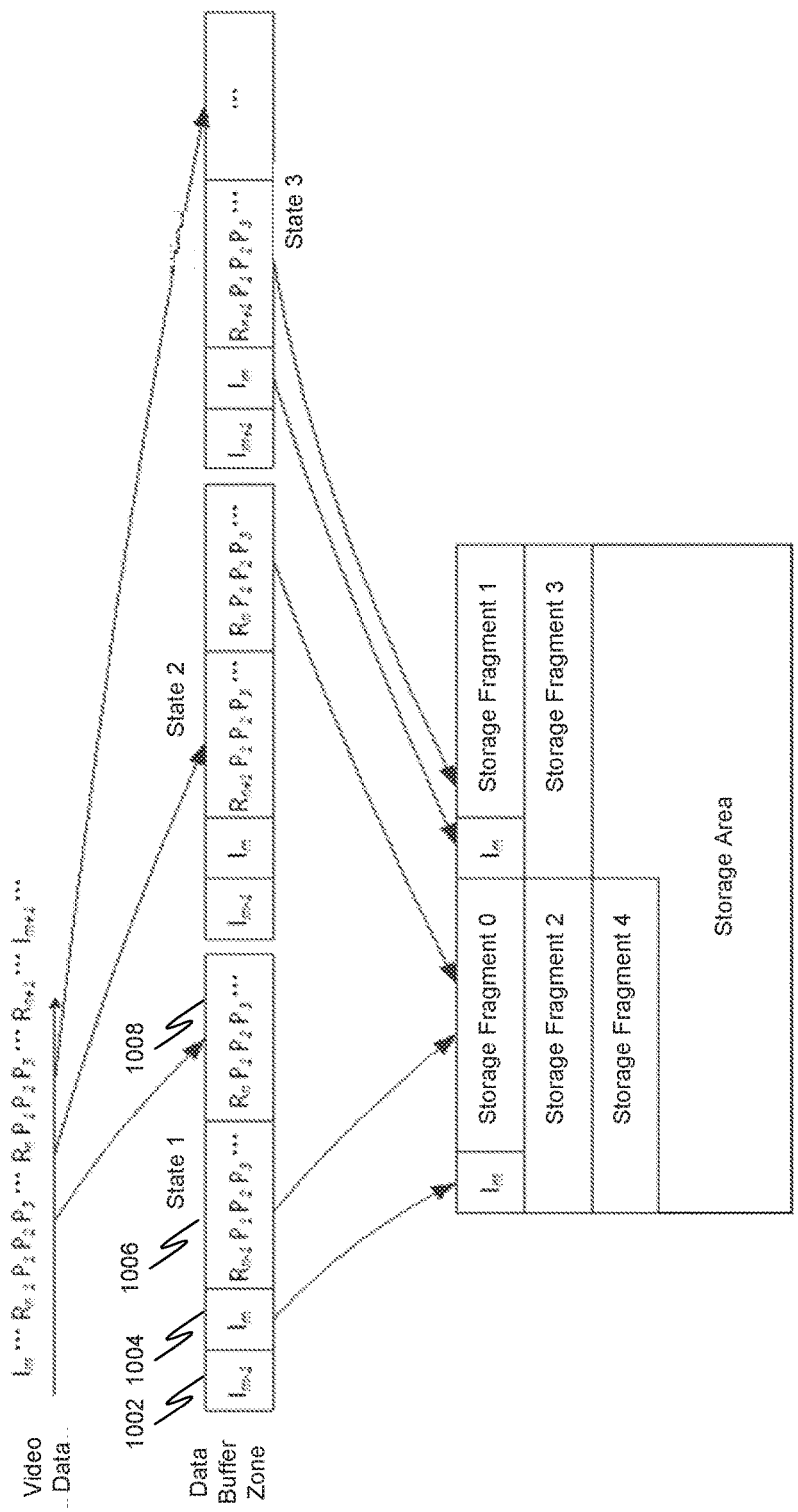
FIG. 10 is an example diagram showing a data buffer zone, according to one embodiment of the present invention.

FIG. 10 is an example diagram showing a data buffer zone, according to one embodiment of the present invention. The data buffer zone is divided into multiple sub-zones, among which two sub-zones (e.g., the sub-zone 1002, the sub-zone 1004) are configured to store I Frames, while other sub-zones (e.g., the sub-zone 1006, the sub-zone 1008) are configured to store an R Frame and one or more P Frames with reference relation to the R Frame. For example, the sub-zone 1004 stores the current I Frame and the sub-zone 1002 stores the earlier I Frame. When another I Frame is acquired in a data buffering process, the earlier I Frame is replaced.

As shown in FIG. 10, in State 1 and State 2, $I_{m-1}$ is the earlier I Frame that will not be used again. $I_m$ is the I Frame currently being used. When a new I Frame, namely $I_{m+1}$, is acquired, $I_{m+1}$ replaces $I_{m-1}$; $I_m$ will become the earlier I Frame, and $I_{m+1}$ becomes the current I Frame. The processing of R Frames is similar to the processing of I Frames, except that the processing of the R Frames also include the processing of P Frames that have reference relation with the R Frames, and the data update for the processing of R Frames is faster compared to that of I Frames. In State 1, $R_{n-1}$ and a subsequent P Frames thereof have already been buffered, and are stored to the storage fragment at this point. At the same time, $R_n$ and the subsequent P Frames thereof are buffered to the data buffer zone. When $R_{n-1}$ and the subsequent P frames thereof are stored, the sub-zone 1006 where Rn−1 and the subsequent P frames are located is cleared in preparation for buffering a new R Frame, namely $R_{n+1}$. When $R_{n-1}$ and the subsequent P frames thereof are stored, $R_n$ and the subsequent P frames are buffered, and thus can be stored to the storage area. The determination prior to storage and the process of I frame insertion have been described above and are not reiterated here. In specific embodiments, to ensure smooth buffering of data, three or more sub-zones can be configured to buffer I Frames and subsequent P Frames to avoid data loss caused by lack of synchronization between data buffering and storage and increase fault tolerance.

In sum, buffer zone data may be generated through video acquisition, and the buffer zone data begins from an I Frame or an R Frame of the video, according to some embodiments. The buffer zone data is stored to a fragment of the storage area. If the fragment is a newly opened fragment and the first frame of the data to be stored to the buffer zone data is an R Frame, then an I Frame with reference relation to the first frame is inserted to the newly opened storage fragment, where the R Frame in the buffer zone data is a picture frame only referring to the I Frame and can act as an object of reference for subsequent non-key frames. Furthermore, the I Frame, the R Frame, and the non-key frames with reference relation are stored to the same storage fragment in the storage area.

For example, the schemes and/or methods disclosed herein can be configured to avoid bit stream loss and change of GOP encoding bit stream structure during the process of storage. As an example, the schemes and/or methods disclosed herein can be configured to avoid cross-storage fragment referencing during the process of reading video, thus achieving quick decoding in random access. In a specific example, the schemes and/or methods disclosed herein can be configured to determine status of storage fragments in a storage area for storing buffer zone data according to different types of first frames in the buffer zone data to ensure quick decoding during video reading.

Figure 11:
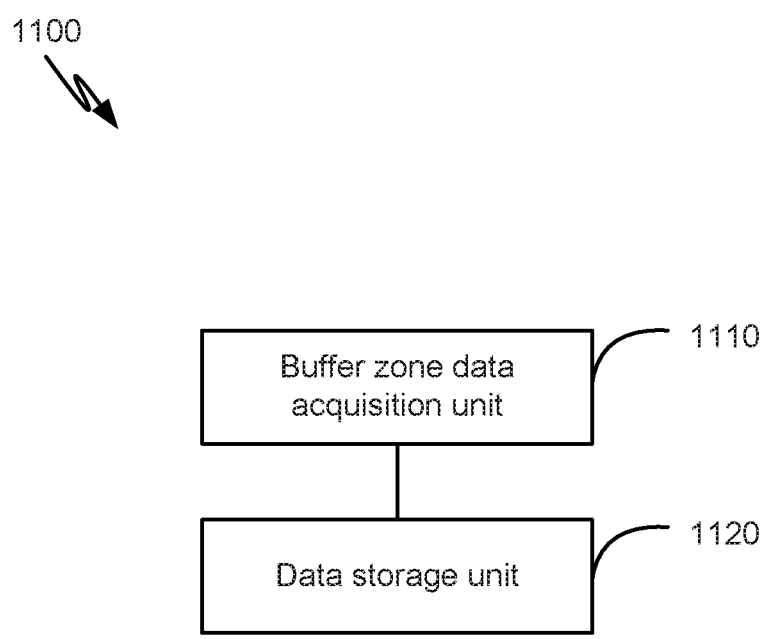
FIG. 11 is an example diagram for a video storage device, according to one embodiment of the present invention.

FIG. 11 is an example diagram for a video storage device, according to one embodiment of the present invention. As shown in FIG. 11, the video storage device 1100 includes: a buffer zone data acquisition unit 1110 and a data storage unit 1120. According to one embodiment, the buffer zone data acquisition unit 1110 is used for acquiring video and generating buffer zone data that begins with an I Frame or an R Frame of the video. For example, the buffer zone is not another independent storage device, but rather a small storage space demarcated in the storage area. The video is not stored to the storage area frame by frame. Instead, frames of the video are organized into groups, and the video is then stored group by group to the storage area. A buffer zone is used for buffering video data before storing the video data to the storage area. A group of frames are buffered first and then stored to the storage area. The buffering process of the buffer zone may include continuous writing, dumping, and re-writing.

According to another embodiment, the data storage unit 1120 is used to store the buffer zone data to storage fragments in the storage area. For example, if a particular storage fragment is a newly opened storage fragment and certain data from the buffer zone data to be stored on the storage fragment includes a first frame that is an R Frame, the data storage unit 1120 inserts an I Frame with reference relation to the first frame of the data to the newly opened storage fragment.

In some embodiments, the R Frame in the buffer zone data is a picture frame only referring to the I Frame. For example, the R Frame can be used as an object of reference for subsequent non-key frames, and the I Frames, R Frames, and non-key frames with reference relation are stored on the same storage fragment in the storage area. In certain embodiments, the operation of inserting an I Frame before the R Frame ensures that the first frame in each storage fragment is an I Frame, thus avoiding cross-storage fragment access.

In specific embodiments, the buffer zone data acquisition unit 1110 and the data storage unit 1120 operate cooperatively to acquire video data and generate the buffer zone data. For example, the buffer zone data begins from an I Frame or an R Frame of the video. The buffer zone data is stored to a fragment of the storage area. If the fragment is a newly opened fragment and the first frame of certain data in the buffer zone data is an R Frame, then an I Frame with reference relation to the first frame is inserted to the newly opened storage fragment, where the R Frame in the buffer zone data is a picture frame only referring to the I Frame. The embodiment of the invention avoids bit stream loss and GOP encoding bit stream structure changes during the process of storage, and avoids cross-storage fragment referencing during the process of reading video, thus achieving quick decoding in random access.

For example, the device 1100 can be configured to avoid bit stream loss and change of GOP encoding bit stream structure during the process of storage. As an example, the device 1100 can be configured to avoid cross-storage fragment referencing during the process of reading video, thus achieving quick decoding in random access.

Figure 12:
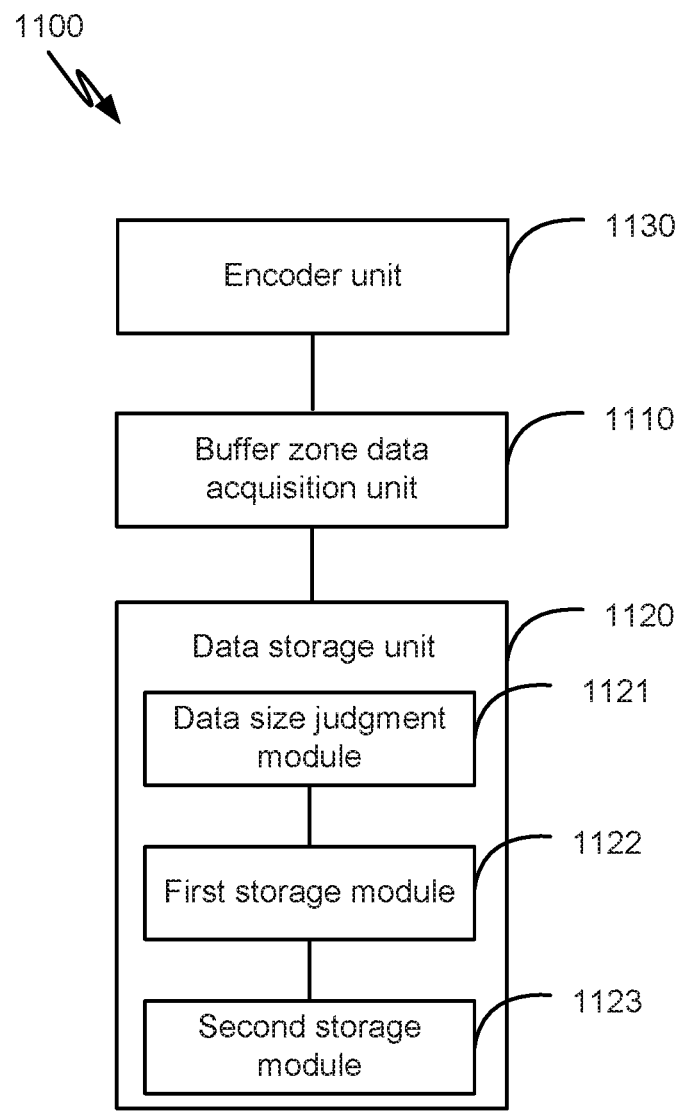
FIG. 12 is an example diagram for a video storage device, according to another embodiment of the present invention.

FIG. 12 is an example diagram for a video storage device, according to another embodiment of the present invention. The video storage device 1100 includes the buffer zone data acquisition unit 1110 configured to acquire video and generate buffer zone data beginning with an I Frame or an R Frame of the video. The data storage unit 1120 is configured to store the buffer zone data to the storage area storage fragment. For example, if the storage fragment is a newly opened storage fragment and certain data from the buffer zone data to be stored on the storage fragment is provided with a first frame that is an R Frame, the data storage unit 1120 is configured to insert an I Frame with reference relation to the first frame to the newly opened storage fragment. As an example, the R Frame in the buffer zone data is a picture frame only referring to the I Frame.

According to another embodiment, the data storage unit 1120 includes: a data size judgment module 1121 configured to judge whether a sum of the data to be stored to the current storage fragment and the data already stored on the current storage fragment is smaller than the storage threshold of the storage fragment. For example, the data storage unit 1120 further includes: a first storage module 1122 configured to store the data to be stored to the current storage fragment to the current storage fragment if the sum of the data to be stored to the current storage fragment and the data already stored on the current storage fragment is not larger than the storage threshold of the storage fragment. As another example, if the sum of the data to be stored to the current storage fragment and the data already stored on the current storage fragment is larger than the storage threshold of the storage fragment, the first storage module 1122 is configured to open a new storage fragment in the storage area and judge whether the first frame of the buffer zone data to be stored to the current storage fragment is an I Frame.

According to yet another embodiment, the data storage unit 1120 further includes: a second storage module 1123 configured to store the data to be stored to the current storage fragment to the current storage fragment if the first frame of the data to be stored to the current storage fragment is an I Frame. For example, the second storage module 1123 is configured to insert an I Frame with reference relation to the R Frame at the very front of the newly opened storage fragment if the first frame is an R Frame, and then store the data be stored to the current storage fragment to the new storage fragment.

In one embodiment, the storage area also stores a quick retrieval information list that records I Frame and R Frame quick retrieval information. For example, the quick retrieval information includes a frame type, a frame length, a relative time mark, an absolute time mark, an offset relative to a start location of the storage fragment, etc. The R Frame is a reference object for subsequent non-key frames. Moreover, the I Frames, R Frames, and non-key frames with reference relation are stored on the same storage fragment of the storage area. In some embodiments, the quick retrieval information list is used to save time in video data reading. When a video sequence is accessed, an object of reference related to a first frame of the video sequence is located directly from the quick retrieval information list.

In certain embodiments, the data storage unit 1120 is configured to: store certain data of the buffer zone data to a storage fragment of the storage area. For example, the data storage unit 1120 is further configured to, if the storage fragment is a newly opened storage fragment and the first frame of the data to be stored to the storage fragment is an R Frame, read a buffered I Frame and insert the buffered I Frame into the very front of the newly opened storage fragment. In another example, the data storage unit 1120 is further configured to store the data to be stored to the current storage fragment to the new storage fragment. In yet another example, the data storage unit 1120 is further configured to buffer an I Frame when the I Frame appears, and replace the buffered I Frame with a new I Frame that appears subsequently.

In specific embodiments, the data storage unit 1120 is configured to store certain data to a storage fragment of the storage area. For example, if the storage fragment is a newly opened storage fragment and the first frame of the data to be stored to the storage fragment is an R Frame, the data storage unit 1120 is configured to read the nearest I Frame on a preceding storage fragment, insert the nearest I Frame into the very front of the newly opened storage fragment, and then store the data to be stored to the current storage fragment to the new storage fragment.

As shown in FIG. 12, the video storage device 1100 further includes: an encoder unit 1130 configured to, before the video is acquired and the buffer zone data is generated from the acquired video, receive a video storage command and encode one or more current pictures according to an encoding method of I Frames. In some embodiments, the encoding unit 1130 is integrated with other units in the video storage device 1100. In certain embodiments, the encoding unit 1130 is configured separately from other units in the video storage device 1100.

In specific embodiments, different units and/or modules in the video storage device 1100 operate cooperatively to acquire video and generate the buffer zone data. For example, the buffer zone data begins from an I Frame or an R Frame of the video. The buffer zone data is stored to a fragment of the storage area. If the fragment is a newly opened fragment and the first frame of the data from the buffer zone data is an R Frame, an I Frame that has reference relation with the first frame is inserted at the very front of the newly opened storage fragment, where the R Frame in the buffer zone data is a picture frame only referring to the I Frame and can act as an object of reference for subsequent non-key frames. Moreover, the I Frames, R Frames, and non-key frames with reference relation are stored on the same fragment of the storage area.

For example, the device 1100 can be configured to avoid bit stream loss and change of GOP encoding bit stream structure during the process of storage. As an example, the device 1100 can be configured to avoid cross-storage fragment referencing during the process of reading video, thus achieving quick decoding in random access. In a specific example, the device 1100 can be configured to determine status of storage fragments in a storage area for storing buffer zone data according to different types of first frames in the buffer zone data to ensure quick decoding during video reading.

Figure 13:
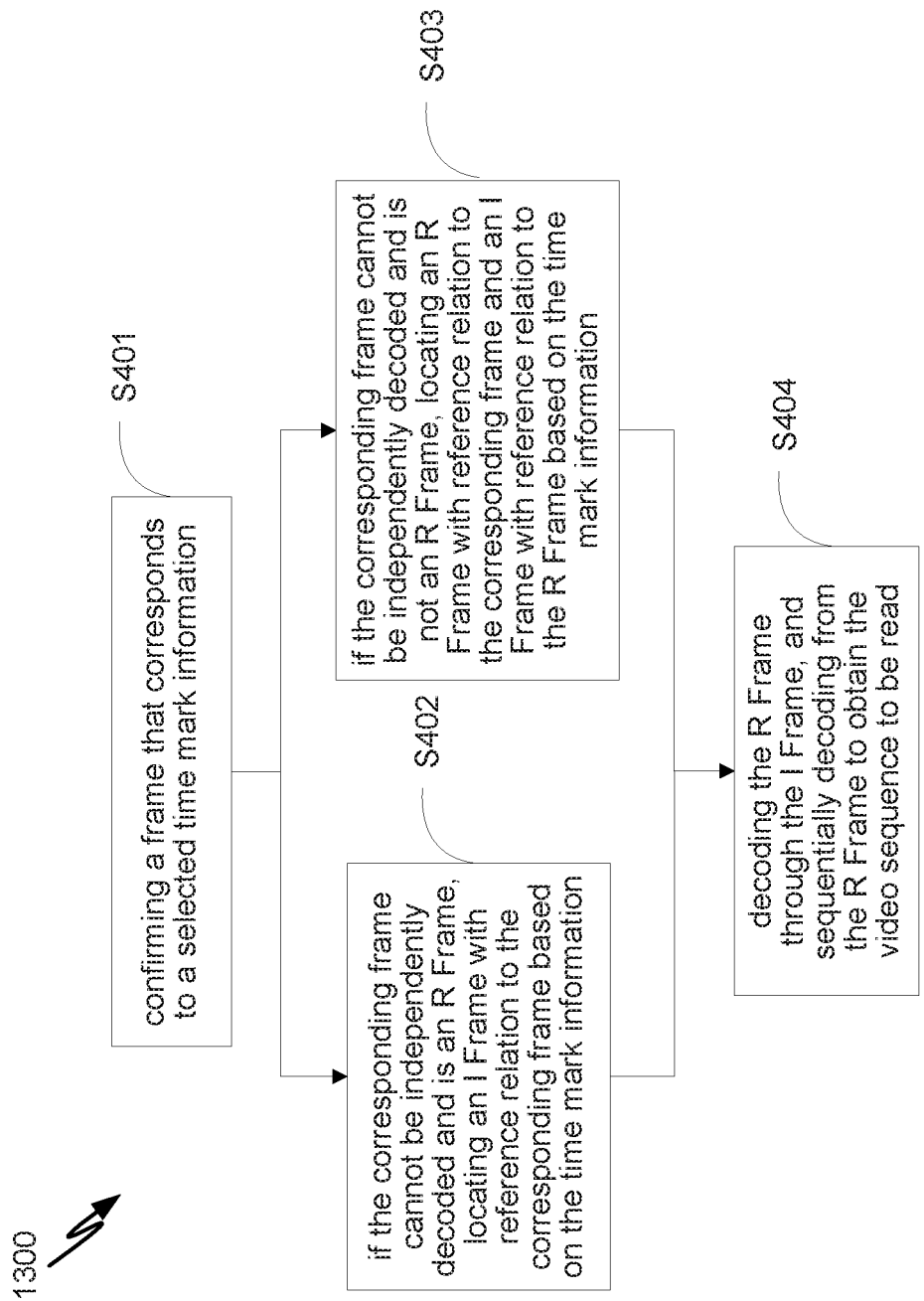
FIG. 13 is an example flow chart for video reading according to one embodiment of the present invention.

FIG. 13 is an example flow chart for video reading according to one embodiment of the present invention. As shown in FIG. 13, the video reading method 1300 includes a number of processes. According to one embodiment, the process S401 includes: determining a frame in a video sequence that corresponds to a selected time mark information. For example, in a process of picture frame storage, time mark information is always carried to record the sequential relation between picture frames. Video decoding can be carried out forward, backward, or independently based on the time mark information. For a random access video sequence, when a first frame (e.g., the frame corresponding to the time mark information selected by a user) of the video sequence is decoded, subsequent picture frames in the video sequence are then decoded thereafter. Therefore, direct decoding or indirect decoding of the first frame is performed first.

According to another embodiment, the process S402 includes: if the corresponding frame cannot be independently decoded and is an R Frame, locating an I Frame with reference relation to the corresponding frame based on the time mark information. For example, if the corresponding frame cannot be independently decoded and is an R Frame, the time mark information is used for comparison with the quick retrieval information list to determine a nearest I Frame in front of the corresponding frame. Based on the quick retrieval information of the I Frame, an offset of the I Frame in a storage fragment relative to the start location of the storage fragment is read to locate the I Frame.

According to yet another embodiment, the process S403 includes: if the corresponding frame cannot be independently decoded and is not an R Frame, locating an R Frame with reference relation to the corresponding frame and an I Frame with reference relation to the R Frame based on the time mark information. For example, if the corresponding frame cannot be independently decoded and is not an R Frame, the time mark information is used for comparison with the quick retrieval information list to determine the nearest I Frame and R Frame in front of the corresponding frame. Based on the quick retrieval information of the I Frame and the R Frame, one or more offsets of the I Frame and the R Frame in a storage fragment relative to the start location of the storage fragment is read to locate the I Frame and the R Frame.

In some embodiments, different frame types of the corresponding frame may correspond to different reference objects. Specifically, reference objects may be of three categories. If the corresponding frame is an I Frame and can be independently decoded, then the corresponding frame can be directly decoded. No further description is provided for such a circumstance. If the corresponding frame is an R Frame, the corresponding frame can be decoded using an I Frame. If the corresponding frame is a P Frame, the corresponding frame can be decoded through an R Frame and an I Frame. For the latter two circumstances, locating at least one reference object is needed. The process S402 and the process S403 are respectively directed at the latter two circumstances.

In certain embodiments, the processes for locating an R Frame and an I Frame are similar. For example, a quick retrieval information list (e.g., as shown in FIG. 9) has been established. The quick retrieval information list includes indices of I Frames and R Frames. During the process of decoding, a nearest reference object in front of the corresponding frame (e.g., when the corresponding frame is an R Frame, the reference object is I Frame; when the corresponding frame is a P Frame, the reference object corresponds to an I Frame and an R Frame) is directly located from the quick retrieval information list based on a time sequence using the time mark information of the corresponding frame. The offset of the reference object in the storage fragment is recorded in the quick retrieval information list, and the reference object can be directly located in the storage fragment based on the offset for the decoding process. In certain embodiments, it is not necessary to successively backtrack through frames in the storage fragment to find the reference object, so that quick locating of reference objects can be achieved. Especially for video data with long GOP, marked improvement of the decoding efficiency can be achieved.

According to one embodiment, the process S404 includes: decoding the R Frame through the I Frame, and sequentially decoding other frames following the R Frame to obtain the video sequence to be read. For example, the R Frame is a picture frame only referring to the I Frame and can act as an object of reference for subsequent non-key frames. Moreover, the I Frames, R Frames, and non-key frames with reference relation are stored on the same storage fragment of the storage area. In some embodiments, any known reference decoding technology may be implemented for decoding the frames herein.

In sum, the relation between the non-key frames and I frames is established through the R frames, so that quick decoding from the I Frames to the non-key frames is achieved, according to some embodiments. Decoding from the I Frames to the R Frames and decoding from the R Frames to the non-key frames are entirely achieved on the same storage fragment, thus avoiding reduction of efficiency resulting from cross-storage fragment decoding. The configuration of a quick retrieval information list, for any frame in video data, can achieve quick locating of a reference object, thereby shortening the distance between target frames and reference frames and improving the decoding efficiency. The methods, systems and/or devices disclosed herein are applicable to video data with long GOP.

Figure 14:
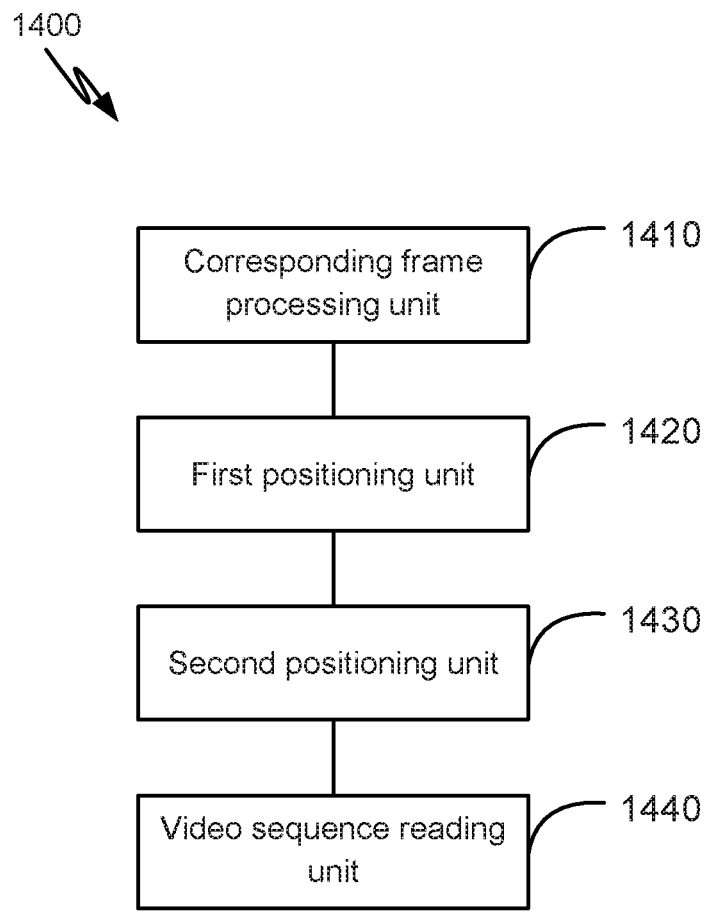
FIG. 14 is an example diagram for a video reading device according to yet another embodiment of the present invention.

FIG. 14 is an example diagram for a video reading device according to yet another embodiment of the present invention. As shown in FIG. 14, the video reading device 1400 includes: a corresponding frame processing unit 1410 for determining a frame in a video sequence that corresponds to a selected time mark information; a first positioning unit 1420 for locating an I Frame with reference relation to the corresponding frame based on the time mark information if the corresponding frame cannot be independently decoded and is an R Frame; a second positioning unit 1430 for locating the R Frame with reference relation to the corresponding frame and the I Frame with reference relation to the R Frame based on the time mark information if the corresponding frame cannot be independently decoded and is an R Frame; and a video sequence reading unit 1440 for decoding the R Frame through the I Frame and successively decoding other frames following the R Frame to obtain the video sequence to be read.

For example, the R Frame is a picture frame only referring to the I Frame and can act as an object of reference for subsequent non-key frames. Moreover, the I Frames, R Frames, and non-key frames with reference relation are stored on the same storage fragment of the storage area.

According to one embodiment, the first positioning unit 1420 is specifically configured to: if the corresponding frame cannot be independently decoded and is an R Frame, determine a nearest I Frame in front of the corresponding frame using the time mark information for comparison with the quick retrieval information list; based on the quick retrieval information of the I Frame, read an offset of the I Frame in a storage fragment relative to the start location of the storage fragment to locate the I Frame.

For example, the second positioning unit 1430 is specifically configured to: if the corresponding frame cannot be independently decoded and is not an R Frame, determine the nearest I Frame and R Frame in front of the corresponding frame using the time mark information for comparison with the quick retrieval information list; based on the quick retrieval information of the I Frame and the R Frame, read one or more offsets of the I Frame and the R Frame in a storage fragment relative to the start location of the storage fragment to locate the I Frame and the R Frame.

For example, the quick retrieval information includes a frame type, a frame length, a relative time mark, an absolute time mark, an offset relative to a start location of the storage fragment, etc. As an example, the quick retrieval information list does not belong to a given storage fragment, but rather is stored to an independent demarcated storage space in the storage area to achieve overall data management of storage fragments, particularly for quick indexing of reference objects.

In sum, one or more functional components of the video reading device 1400 operate cooperatively to establish the relation between the non-key frames and I frames through the R frames, so that quick decoding from the I Frames to the non-key frames is achieved. Decoding from the I Frames to the R Frames and decoding from the R Frames to the non-key frames are entirely achieved on the same storage fragment, thus avoiding reduction of efficiency resulting from cross-storage fragment decoding. The configuration of the quick retrieval information list, for any frame in video data, can achieve quick locating of a reference object, thereby shortening the distance between target frames and reference frames and improving the decoding efficiency. The device 1400 is applicable to video data with long GOP, in some embodiments.

Figure 15:
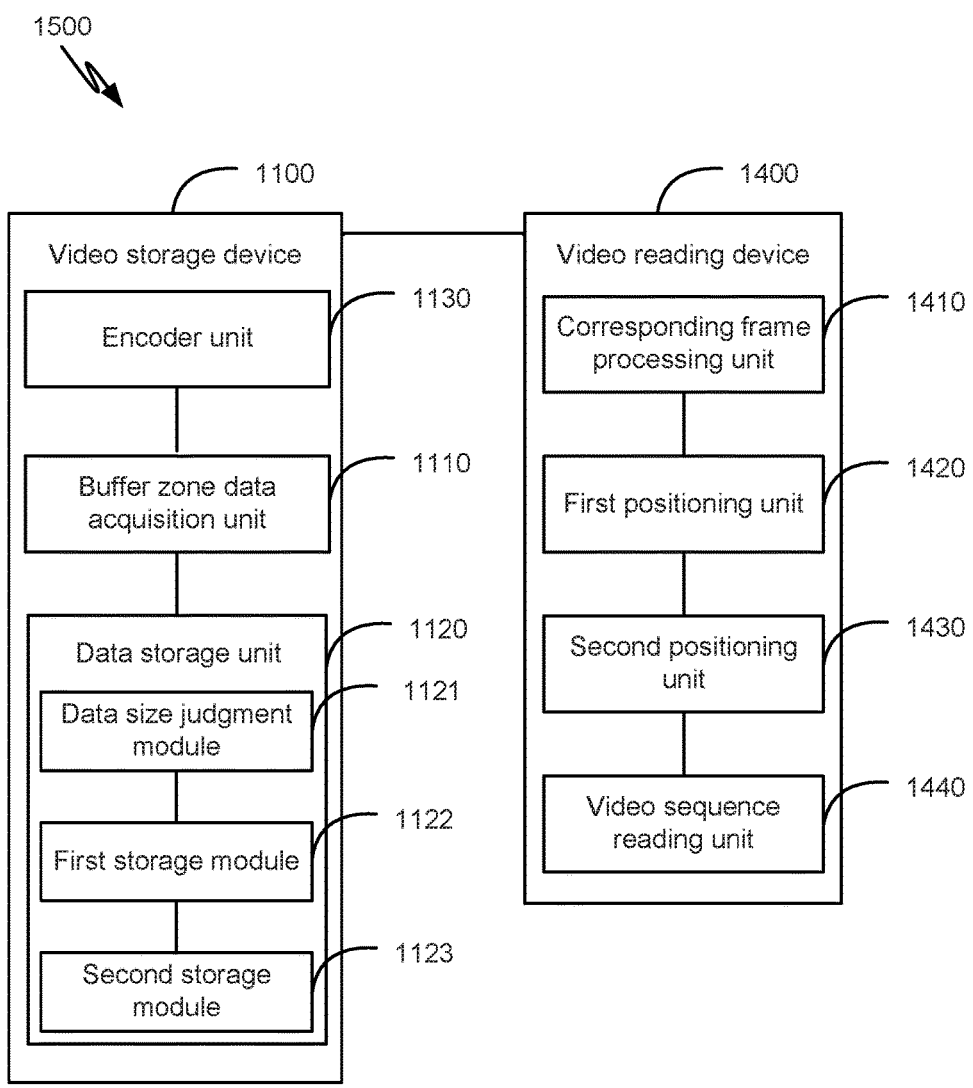
FIG. 15 is an example diagram for a video storage system, according to one embodiment of the present invention.

FIG. 15 is an example diagram for a video storage system, according to one embodiment of the present invention. As shown in the figure, the video storage system 1500 comprises the video storage device 1100 and the video reading device 1400. According to one embodiment, the video storage device 300 comprises: a buffer zone data acquisition unit 1110 configured to acquire video and generate buffer zone data beginning with an I Frame or an R Frame of the video; a data storage unit 1120 configured to store the buffer zone data to a storage fragment. For example, if a particular storage fragment is a newly opened storage fragment and certain data from the buffer zone data to be stored on the storage fragment includes a first frame that is an R Frame, the data storage unit 1120 inserts an I Frame with reference relation to the first frame of the data to the newly opened storage fragment. In some embodiments, the R Frame in the buffer zone data is a picture frame only referring to the I Frame.

According to another embodiment, the data storage unit 1120 comprises: a data size judgment module 1121 configured to judge whether a sum of the data to be stored to the current storage fragment and the data already stored on the current storage fragment is smaller than the storage threshold of the storage fragment; and a first storage module 1122 configured to store the data to be stored to the current storage fragment to the current storage fragment if the sum of the data to be stored to the current storage fragment and the data already stored on the current storage fragment is not larger than the storage threshold of the storage fragment. For example, if the sum of the data to be stored to the current storage fragment and the data already stored on the current storage fragment is larger than the storage threshold of the storage fragment, the first storage module 1122 is configured to open a new storage fragment in the storage area and judge whether the first frame of the buffer zone data to be stored to the current storage fragment is an I Frame.

According to yet another embodiment, the data storage unit 1120 further comprises: a second storage module 1123 configured to store the data to be stored to the current storage fragment to the current storage fragment if the first frame of the data to be stored to the current storage fragment is an I Frame. For example, the second storage module 1123 is configured to insert an I Frame with reference relation to the R Frame at the very front of the newly opened storage fragment if the first frame is an R Frame, and then store the data be stored to the current storage fragment to the new storage fragment. In some embodiments, the storage area also stores a quick retrieval information list that records I Frame and R Frame quick retrieval information. For example, the quick retrieval information includes a frame type, a frame length, a relative time mark, an absolute time mark, an offset relative to a start location of the storage fragment, etc. The R Frame is a reference object for subsequent non-key frames. Moreover, the I Frames, R Frames, and non-key frames with reference relation are stored on the same storage fragment of the storage area.

In one embodiment, the data storage unit 1120 is specifically configured to store certain data of the buffer zone data to a storage fragment of the storage area. For example, the data storage unit 1120 is further configured to, if the storage fragment is a newly opened storage fragment and the first frame of the data to be stored to the storage fragment is an R Frame, read a buffered I Frame and insert the buffered I Frame into the very front of the newly opened storage fragment. In another example, the data storage unit 1120 is further configured to store the data to be stored to the current storage fragment to the new storage fragment. In yet another example, the data storage unit 1120 is further configured to buffer an I Frame when the I Frame appears, and replace the buffered I Frame with a new I Frame that appears subsequently.

In specific embodiments, the data storage unit 1120 is configured to store certain data to a storage fragment of the storage area. For example, if the storage fragment is a newly opened storage fragment and the first frame of the data to be stored to the storage fragment is an R Frame, the data storage unit 1120 is configured to read the nearest I Frame on a preceding storage fragment, insert the nearest I Frame into the very front of the newly opened storage fragment, and then store the data to be stored to the current storage fragment to the new storage fragment.

In some embodiments, the quick retrieval information list is used to save time in video data reading. When a video sequence is accessed, an object of reference related to a first frame of the video sequence is located directly from the quick retrieval information list. In certain embodiments, the length of the video corresponding to the buffer zone data is 1-3 seconds.

According to one embodiment, the video reading device 1500 comprises: a corresponding frame processing unit 1410 configured to determine a frame in a video sequence that corresponds to a selected time mark information; a first positioning unit 1420 configured to locate an I Frame with reference relation to the corresponding frame based on the time mark information if the corresponding frame cannot be independently decoded and is an R Frame; a second positioning unit 1430 for locating the R Frame with reference relation to the corresponding frame and the I Frame with reference relation to the R Frame based on the time mark information if the corresponding frame cannot be independently decoded and is an R Frame; and a video sequence reading unit 1440 for decoding the R Frame through the I Frame and successively decoding other frames following the R Frame to obtain the video sequence to be read.

For example, the R Frame is a picture frame only referring to the I Frame and can act as an object of reference for subsequent non-key frames. Moreover, the I Frames, R Frames, and non-key frames with reference relation are stored on the same storage fragment of the storage area.

According to another embodiment, the first positioning unit 1420 is specifically configured to: if the corresponding frame cannot be independently decoded and is an R Frame, determine a nearest I Frame in front of the corresponding frame using the time mark information for comparison with the quick retrieval information list; based on the quick retrieval information of the I Frame, read an offset of the I Frame in a storage fragment relative to the start location of the storage fragment to locate the I Frame.

For example, the second positioning unit 1430 is specifically configured to: if the corresponding frame cannot be independently decoded and is not an R Frame, determine the nearest I Frame and R Frame in front of the corresponding frame using the time mark information for comparison with the quick retrieval information list; based on the quick retrieval information of the I Frame and the R Frame, read one or more offsets of the I Frame and the R Frame in a storage fragment relative to the start location of the storage fragment to locate the I Frame and the R Frame. As an example, the quick retrieval information includes a frame type, a frame length, a relative time mark, an absolute time mark, an offset relative to a start location of the storage fragment, etc.

In sum, through the coordination of the various functional components, units and modules, buffer zone data may be generated through video acquisition, and the buffer zone data begins from an I Frame or an R Frame of the video, according to some embodiments of the present invention. The buffer zone data is stored to a fragment of the storage area. If the fragment is a newly opened fragment and if the first frame of the data to be stored to the buffer zone data is an R Frame, then an I Frame with reference relation to the first frame is inserted to the newly opened storage fragment, where the R Frame in the buffer zone data is a picture frame only referring to the I Frame.

For example, the systems, devices, and/or methods disclosed herein can be configured to avoid bit stream loss and change of GOP encoding bit stream structure during the process of storage. As an example, the systems, devices, and/or methods disclosed herein can be configured to avoid cross-storage fragment referencing during the process of reading video, thus achieving quick decoding in random access. In a specific example, the systems, devices, and/or methods disclosed herein can be configured to determine status of storage fragments in a storage area for storing buffer zone data according to different types of first frames in the buffer zone data to ensure quick decoding during video reading.

In some embodiments, the relation between the non-key frames and I frames is established through the R frames, so that quick decoding from the I Frames to the non-key frames is achieved, according to some embodiments. Decoding from the I Frames to the R Frames and decoding from the R Frames to the non-key frames are entirely achieved on the same storage fragment, thus avoiding reduction of efficiency resulting from cross-storage fragment decoding. The configuration of a quick retrieval information list, for any frame in video data, can achieve quick locating of a reference object, thereby shortening the distance between target frames and reference frames and improving the decoding efficiency. The methods, systems and/or devices disclosed herein are applicable to video data with long GOP.

In specific embodiments, the combination of the video storage schemes and the video reading schemes disclosed herein can achieve rapid, accurate, and complete video storage, avoiding loss of video data when a first frame of the data buffer zone is not a reference object. Moreover, when the corresponding stored video data is read, decoding can be directly completed within a same storage fragment, without any cross-storage fragment association. At the same time, a quick retrieval information list also improves the efficiency of data access and improves decoding efficiency by directly accessing corresponding data based on reference object locations.

Figure 16:
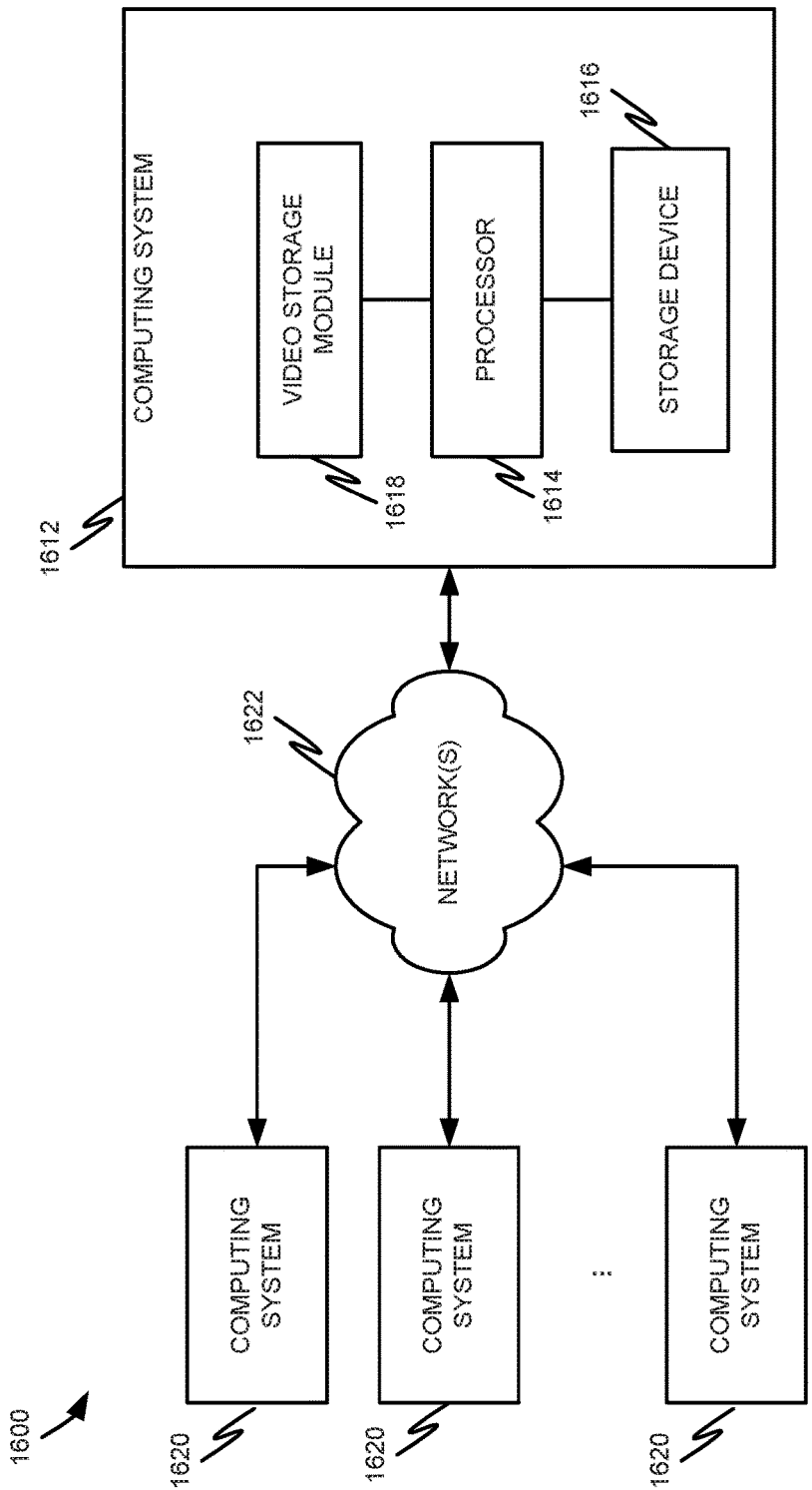
FIG. 16 is an example diagram for a system for video storage according to one embodiment of the present invention.

FIG. 16 is an example diagram for a system for video storage according to one embodiment of the present invention. As shown in FIG. 16, the system 1600 includes a computing system 1612 which contains a processor 1614, a storage device 1616 and a video storage module 1618. The computing system 1612 includes any suitable type of computing device (e.g., a server, a desktop, a laptop, a tablet, a mobile phone, etc.) that includes the processor 1614 or provide access to a processor via a network or as part of a cloud based application. The video storage module 1618 includes tasks and is implemented as part of a user interface module (not shown in FIG. 16).

Figure 17:
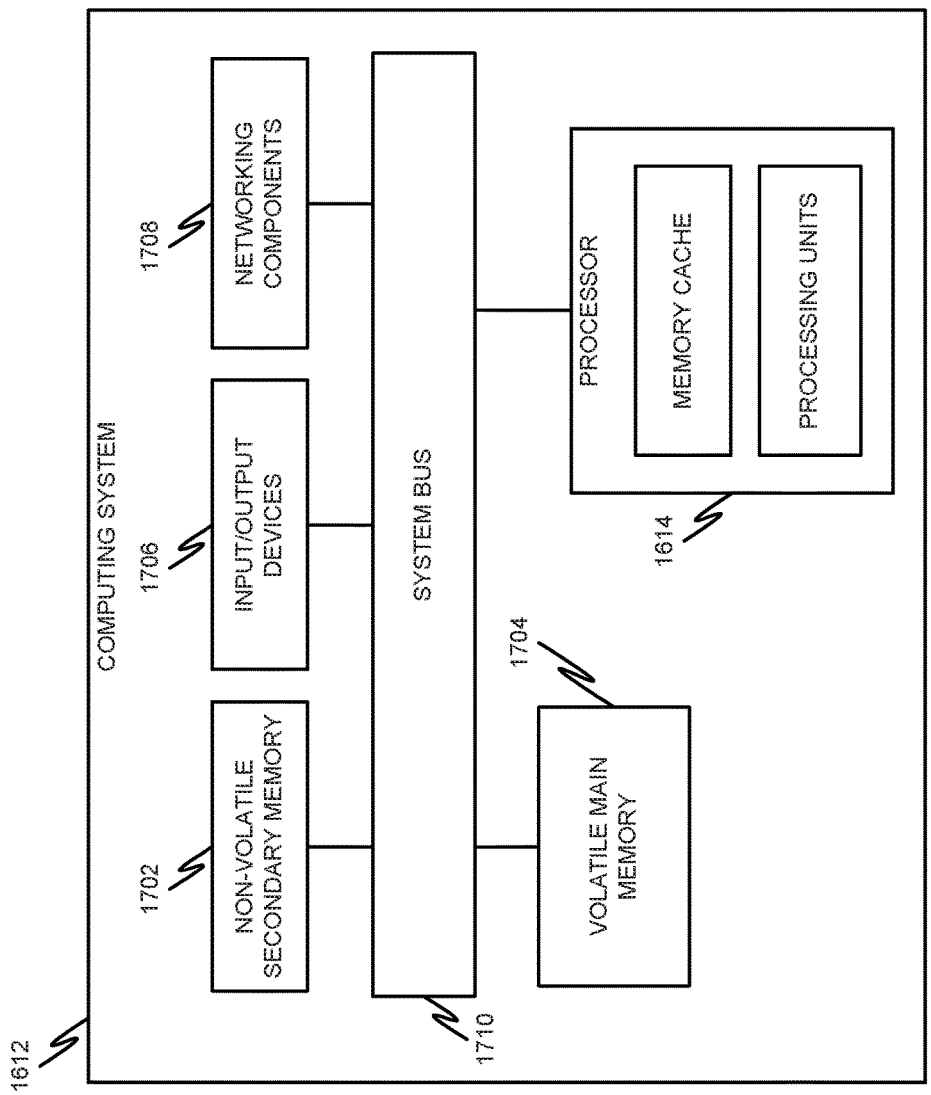
FIG. 17 depicts an example diagram showing a computing system for video storage.

FIG. 17 depicts an example diagram showing a computing system for video storage. As shown in FIG. 17, the computing system 1612 includes a processor 1614, memory devices 1702 and 1704, one or more input/output devices 1706, one or more networking components 1708, and a system bus 1710. In some embodiments, the computing system 1612 includes the video storage module 1618, and provides access to the video storage module 1618 to a user as a stand-alone computer.

According to one embodiment, a method is provided for video storage. For example, video data is acquired for generating buffer zone data, the buffer zone data beginning with an I frame or an R frame of the video. At least part of the buffer zone data is stored to a storage fragment in a storage area. In response to the storage fragment being newly opened and a first frame of the at least part of the buffer zone data being an R Frame, an I Frame with reference relation to the first frame is inserted to the storage fragment, the R Frame corresponding to a picture frame referring to the I Frame.

According to another embodiment, a device for video storage includes: a buffer zone data acquisition unit configured to acquire video data for generating buffer zone data, the buffer zone data beginning with an I frame or an R frame of the video; and a data storage unit configured to: store at least part of the buffer zone data to a storage fragment in a storage area associated with one or more non-transitory storage media; and in response to the storage fragment being newly opened and a first frame of the at least part of the buffer zone data being an R Frame, insert an I Frame with reference relation to the first frame to the storage fragment, the R Frame corresponding to a picture frame referring to the I Frame.

According to yet another embodiment, a method for video reading is provided. For example, a corresponding frame in video data that corresponds to time mark information is determined. In response to the corresponding frame not being independently decoded and being an R Frame, an I Frame with reference relation to the corresponding frame is located based at least in part on the time mark information. In response to the corresponding frame not being independently decoded and not being an R Frame, an R Frame with reference relation to the corresponding frame and an I Frame with reference relation to the R Frame are located based at least in part on the time mark information, the located R Frame corresponding to a picture frame referring to the located I Frame. The R Frame is decoded through the I Frame. One or more other frames that follow the R Frame are decoded to obtain the video data to be read.

In one embodiment, a device for video reading includes: a corresponding frame processing unit configured to determine a corresponding frame in video data that corresponds to time mark information; a first positioning unit configured to, in response to the corresponding frame not being independently decoded and being an R Frame, locate an I Frame with reference relation to the corresponding frame based at least in part on the time mark information; a second positioning unit configured to, in response to the corresponding frame not being independently decoded and not being an R Frame, locate an R Frame with reference relation to the corresponding frame and an I Frame with reference relation to the R Frame based at least in part on the time mark information, the located R Frame corresponding to a picture frame referring to the located I Frame; and a video sequence reading unit configured to decode the R Frame through the I Frame and decode one or more other frames that follow the R Frame to obtain the video data to be read.

In another embodiment, a system for video storage includes: a video storage device; and a video reading device. The video storage device includes: a buffer zone data acquisition unit configured to acquire video data for generating buffer zone data, the buffer zone data beginning with an I frame or an R frame of the video; a data storage unit configured to: store at least part of the buffer zone data to a storage fragment in a storage area associated with one or more non-transitory storage media; and in response to the storage fragment being newly opened and a first frame of the at least part of the buffer zone data being an R Frame, insert an I Frame with reference relation to the first frame to the storage fragment, the R Frame corresponding to a picture frame referring to the I Frame. The video reading device includes: a corresponding frame processing unit configured to determine a corresponding frame in the video data that corresponds to time mark information; a first positioning unit configured to, in response to the corresponding frame not being independently decoded and being an R Frame, locate an I Frame with reference relation to the corresponding frame based at least in part on the time mark information; a second positioning unit configured to, in response to the corresponding frame not being independently decoded and not being an R Frame, locate an R Frame with reference relation to the corresponding frame and an I Frame with reference relation to the R Frame based at least in part on the time mark information, the located R Frame corresponding to a picture frame referring to the located I Frame; and a video sequence reading unit configured to decode the R Frame through the I Frame and decode one or more other frames that follow the R Frame to obtain the video data to be read.

The above only describes several scenarios presented by this invention, and the description is relatively specific and detailed, yet it cannot therefore be understood as limiting the scope of this invention. It should be noted that ordinary technicians in the field may also, without deviating from the invention's conceptual premises, make a number of variations and modifications, which are all within the scope of this invention. As a result, in terms of protection, the patent claims shall prevail. Also, the diagrams in the present disclosure are merely examples, which should not unduly limit the scope of the claims. One of ordinary skill in the art would recognize many variations, alternatives, and modifications.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A processor-implemented method for video storage, the method comprising: receiving buffer zone data for storage; determining whether a sum of the buffer zone data and data already stored on a current fragment is not larger than a storage threshold of the current fragment; in response to the sum of the buffer zone data and the data already stored on the current fragment being not larger than the storage threshold of the current fragment, storing the buffer zone data to the current fragment; and in response to the sum of the buffer zone data and the data already stored on the current fragment being larger than the storage threshold of the current fragment, opening a new fragment; determining whether a first frame of the buffer zone data is an I Frame or an R Frame, wherein an R Frame is a modified type of P frame that only refers to a preceding I Frame and does not refer to a preceding common P frame; in response to the first frame of the buffer zone data being an I Frame, storing the buffer zone data to the new fragment; in response to the first frame of the buffer zone data being an R Frame; inserting an I Frame with reference relation to the R Frame at the front of the new fragment, wherein the R Frame corresponds to a picture frame only referring to the I Frame; and storing the buffer zone data to the new fragment; wherein: the storage area includes a quick retrieval information list for recording quick retrieval information of I Frames and R Frames; the quick retrieval information includes a frame type, a frame length, a relative time mark, an absolute time mark, and an offset relative to a start location of the storage fragment; an R Frame is a reference object for one or more subsequent non-key frames; and one or more I Frames, one or more R Frames, and one or more non-key frames with reference relation are stored on a same fragment in the storage area.

2. The method of claim 1, further comprising:
   in response to the storage fragment being newly opened and the first frame of the at least part of the buffer zone data being an R Frame,
      obtaining a buffered I Frame;

inserting the buffered I Frame to the front of the newly opened storage fragment; and
storing the at least part of the buffer zone data to the newly opened storage fragment;
wherein the buffered I Frame is replaced in response to a new I Frame.

3. The method of claim 1, further comprising:
in response to the storage fragment being newly opened and the first frame of the at least part of the buffer zone data being an R Frame,
obtaining a nearest I Frame on a preceding storage fragment;
inserting the nearest I Frame to the front of the newly opened storage fragment;
storing the at least part of the buffer zone data to the newly opened storage fragment.

4. The method of claim 1, further comprising:
receiving a video storage command; and
encoding one or more current pictures according to an encoding method of I Frames.

5. A device for video storage, the device comprising: a buffer zone data acquisition unit stored in a non-transitory computer readable medium and executable by a processor, and configured to acquire video data for generating buffer zone data; and a data storage unit configured to: store at least part of the buffer zone data to a storage fragment in a storage area associated with one or more non-transitory storage media; and in response to the storage fragment being a first frame of the at least part of the buffer zone data being an R Frame, insert an I Frame with reference relation to the first frame into the storage fragment, the R Frame corresponding to a picture frame referring only to the I Frame, wherein an R Frame is a modified type of P frame that only refers to a preceding I Frame and does not refer to a preceding common P frame; an encoder unit, stored in anon-transitory computer readable medium and executable by a processor, and configured to receive a video storage command and encode one or more current pictures according to an encoding method of I Frames: wherein: the storage area includes a quick retrieval information list for recording quick retrieval information of I Frames and R Frames: the quick retrieval information includes a frame type, a frame length, a relative time mark, an absolute time mark, and an offset relative to a start location of the storage fragment: an R Frame is a reference object for one or more subsequent non-key frames and one or more I Frames, one or more R Frames, and one or more non-key frames with reference relation are stored on a same fragment in the storage area.

6. The device of claim 5, wherein the data storage unit includes:
a data size judgment module, stored in a non-transitory computer readable medium and executable by a processor, and configured to determine whether a sum of the at least part of the buffer zone data and data already stored on a current fragment is not larger than a storage threshold of the current fragment;
a first storage module configured to:
in response to the sum of the at least part of the buffer zone data and the data already stored on the current fragment being not larger than the storage threshold of the current fragment, store the at least part of the buffer zone data to the current fragment; and
in response to the sum of the at least part of the buffer zone data and the data already stored on the current fragment being larger than the storage threshold of the current fragment, open a new fragment and determine whether the first frame of the at least part of the buffer zone data is an I Frame; and
a second storage module configured to:
in response to the first frame of the at least part of the buffer zone data being an I Frame, store the at least part of the buffer zone data to the new fragment; and
in response to the first frame of the at least part of the buffer zone data being an R Frame,
insert an I Frame with reference relation to the R Frame at the front of the new fragment, and
store the at least part of the buffer zone data to the new fragment.

7. The device of claim 5, wherein the data storage unit is further configured to:
in response to the storage fragment being newly opened and the first frame of the at least part of the buffer zone data being an R Frame,
obtain a buffered I Frame;
insert the buffered I Frame to the front of the newly opened storage fragment;
store the at least part of the buffer zone data to the newly opened storage fragment; and
replace the buffered I Frame in response to a new I Frame.

8. The device of claim 5, wherein the data storage unit is further configured to:
in response to the storage fragment being newly opened and the first frame of the at least part of the buffer zone data being an R Frame,
obtain a nearest I Frame on a preceding storage fragment;
insert the nearest I Frame to the front of the newly opened storage fragment;
store the at least part of the buffer zone data to the newly opened storage fragment.

9. A processor-implemented method for video reading, the method comprising:
determining, using one or more processors, a corresponding frame in video data that corresponds to time mark information;
determining a frame type of the corresponding frame;
in response to the frame type of the corresponding frame being R Frame, locating an I Frame with reference relation to the corresponding frame based at least in part on the time mark information, wherein an R Frame is a modified type of P frame that only refers to a preceding I Frame and does not refer to a preceding common P frame
in response to the frame type of the corresponding frame being a frame type other than R Frame or I Frame, locating an R Frame with reference relation to the corresponding frame and an I Frame with reference relation to the R Frame based at least in part on the time mark information, the located R Frame corresponding to a picture frame referring only to the located I Frame;
decoding, using one or more processors, the R Frame through the I Frame; and
decoding, using one or more processors, one or more other frames that follow the R Frame to obtain the video data to be read,
wherein the R Frame is an object of reference for one or more subsequent non-key frames, and one or more I Frames, one or more R Frames, and one or more non-key frames with reference relation are stored on a same storage fragment of a storage area.

10. The method of claim 9, wherein in response to the frame type of the corresponding frame being R Frame, locating an I Frame with reference relation to the corresponding frame based at least in part on the time mark information includes:
  in response to the frame type of the corresponding frame being R Frame,
    determining a nearest I Frame in front of the corresponding frame using the time mark information for comparison with a quick retrieval information list; and
    reading an offset of the nearest I Frame in a storage fragment relative to a start location of the storage fragment to locate the nearest I Frame based at least in part on quick retrieval information of the nearest I Frame;
  wherein the quick retrieval information includes a frame type, a frame length, a relative time mark, an absolute time mark, and the offset relative to the start location of the storage fragment.

11. The method of claim 9, wherein in response to the frame type of the corresponding frame being a frame type other than R Frame or I Frame, locating an R Frame with reference relation to the corresponding frame and an I Frame with reference relation to the R Frame based at least in part on the time mark information includes:
  in response to the corresponding frame being a frame type other than R Frame or I Frame,
    determining a nearest I Frame and R Frame in front of the corresponding frame using the time mark information for comparison with a quick retrieval information list; and
    reading one or more offsets of the nearest I Frame and the R Frame in a storage fragment relative to a start location of the storage fragment to locate the nearest I Frame and R Frame based at least in part on quick retrieval information of the nearest I Frame and R Frame;
  wherein the quick retrieval information includes a frame type, a frame length, a relative time mark, an absolute time mark, the one or more offsets relative to the start location of the storage fragment.

12. A device for video reading, the device comprising:
  a corresponding frame processing unit, stored in a non-transitory computer readable medium and executable by a processor, and configured to determine a corresponding frame in video data that corresponds to time mark information;
  a first positioning unit configured to, in response to the corresponding frame being an R Frame, locate an I Frame with reference relation to the corresponding frame based at least in part on the time mark information, wherein an R Frame is a modified type of P frame that only refers to a preceding I Frame and does not refer to a preceding common P frame;
  a second positioning unit configured to, in response to the corresponding frame having a frame type other than R Frame or I Frame, locate an R Frame with reference relation to the corresponding frame and an I Frame with reference relation to the R Frame based at least in part on the time mark information, the located R Frame corresponding to a picture frame referring only to the located I Frame; and
  a video sequence reading unit configured to decode the R Frame through the I Frame and decode one or more other frames that follow the R Frame to obtain the video data to be read,
  wherein the R Frame is an object of reference for one or more subsequent non-key frames, and one or more I Frames, one or more R Frames, and one or more non-key frames with reference relation are stored on a same storage fragment of a storage area.

13. The device of claim 12, wherein:
  the first positioning unit is further configured to, in response to the corresponding frame being an R Frame,
    determine a nearest I Frame in front of the corresponding frame using the time mark information for comparison with a quick retrieval information list; and
    read an offset of the nearest I Frame in a storage fragment relative to a start location of the storage fragment to locate the nearest I Frame based at least in part on quick retrieval information of the nearest I Frame; and
  the second positioning unit is further configured to, in response to the corresponding frame not being a frame type other that I Frame or R Frame,
    determine a nearest I Frame and R Frame in front of the corresponding frame using the time mark information for comparison with a quick retrieval information list; and
    read one or more offsets of the nearest I Frame and the R Frame in a storage fragment relative to a start location of the storage fragment to locate the nearest I Frame and R Frame based at least in part on quick retrieval information of the nearest I Frame and R Frame;
  wherein the quick retrieval information includes a frame type, a frame length, a relative time mark, an absolute time mark, and the offset relative to the start location of the storage fragment.

* * * * *

(12) SUPPLEMENTAL EXAMINATION CERTIFICATE

United States Patent
Chen et al.

(10) Number: US 10,170,156 F1
(45) Certificate Issued: Dec. 23, 2019

Control No.: 96/000,296  Filing Date: Nov. 20, 2019
Primary Examiner: Christina Y. Leung No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 2014/0032777 A1 | 1/2014 | Yuan et al. |
| 2007/0002946 A1 | 1/2007 | Bouton et al. |

FOREIGN PATENT DOCUMENTS

| | | |
|---|---|---|
| CN | 101287120 A | 10/2008 |
| CN | 101035284 A | 9/2007 |
| CN | 101316357 A | 12/2008 |
| CN | 102378008 A | 3/2012 |
| CN | 101188760 A | 5/2008 |